United States Patent
Zeng et al.

(10) Patent No.: US 11,510,175 B2
(45) Date of Patent: Nov. 22, 2022

(54) METHOD AND DEVICE FOR SENDING UPLINK DATA BY AN INACTIVE TERMINAL

(71) Applicant: HUAWEI TECHNOLOGIES CO., LTD., Shenzhen (CN)

(72) Inventors: Qinghai Zeng, Shanghai (CN); Xiaoying Xu, Shanghai (CN); Tingting Geng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 78 days.

(21) Appl. No.: 17/003,086

(22) Filed: Aug. 26, 2020

(65) Prior Publication Data
US 2020/0389867 A1 Dec. 10, 2020

Related U.S. Application Data

(63) Continuation of application No. PCT/CN2019/082443, filed on Apr. 12, 2019.

(30) Foreign Application Priority Data

Mar. 1, 2018 (CN) .......................... 201810172450.7

(51) Int. Cl.
*H04W 68/00* (2009.01)
*H04W 76/30* (2018.01)
(Continued)

(52) U.S. Cl.
CPC .......... *H04W 68/005* (2013.01); *H04W 36/08* (2013.01); *H04W 76/11* (2018.02);
(Continued)

(58) Field of Classification Search
CPC ... H04W 68/005; H04W 76/30; H04W 76/11; H04W 76/27; H04W 36/08; H04W 80/02;
(Continued)

(56) References Cited

U.S. PATENT DOCUMENTS

2012/0069728 A1  3/2012 Jung et al.
2018/0035484 A1* 2/2018 Kim ...................... H04W 76/19
(Continued)

FOREIGN PATENT DOCUMENTS

CN  102340886 A   2/2012
CN  103460788 A  12/2013
(Continued)

OTHER PUBLICATIONS

Samsung:"DRB and QoS management in Inactive", 3GPP TSG-RAN WG2 Feb. 2017 RAN2#97, R2-1701528, Athens, Greece, Feb. 13, 2017. total 3 pages.
(Continued)

*Primary Examiner* — Mewale A Ambaye
(74) *Attorney, Agent, or Firm* — Rimon PC

(57) ABSTRACT

This application relates to the field of communications technologies, and discloses a communication method and a communication apparatus, to reduce service delay due to uplink data cannot be directly sent by a terminal when the terminal is in an inactive state. The method in this application includes: receiving a first message from a first access network device; then releasing or suspending a configured dedicated signaling radio bearer SRB and resetting protocol entities corresponding to a configured data radio bearer DRB. The first message is used to indicate to a terminal to enter a radio resource control (RRC) inactive state, and the first message carries an identifier of the terminal in the radio resource control (RRC) inactive state and radio access network notification area (RNA) information.

18 Claims, 14 Drawing Sheets

(51) Int. Cl.
   *H04W 76/11* (2018.01)
   *H04W 76/27* (2018.01)
   *H04W 36/08* (2009.01)
   *H04W 80/02* (2009.01)
   *H04W 80/08* (2009.01)

(52) U.S. Cl.
   CPC ........... *H04W 76/27* (2018.02); *H04W 76/30* (2018.02); *H04W 80/02* (2013.01); *H04W 80/08* (2013.01)

(58) Field of Classification Search
   CPC ..... H04W 80/08; H04W 76/38; H04W 48/20; H04W 76/34; H04W 76/10; H04W 36/10
   See application file for complete search history.

(56) References Cited

U.S. PATENT DOCUMENTS

| | | | | |
|---|---|---|---|---|
| 2018/0184362 | A1* | 6/2018 | Babaei | H04W 76/18 |
| 2018/0352601 | A1* | 12/2018 | Park | H04L 5/0055 |
| 2019/0124710 | A1* | 4/2019 | Stattin | H04L 63/061 |
| 2019/0313333 | A1* | 10/2019 | Kim | H04W 76/27 |
| 2019/0342804 | A1* | 11/2019 | Futaki | H04W 36/14 |
| 2020/0092779 | A1* | 3/2020 | Jung | H04W 36/0011 |

FOREIGN PATENT DOCUMENTS

| | | |
|---|---|---|
| CN | 106714315 A | 5/2017 |
| EP | 3244672 A1 | 11/2017 |
| WO | 2014185702 A1 | 11/2014 |

OTHER PUBLICATIONS

Huawei, HiSilicon:"Timer based state transition from Connected to Inactive", 3GPP TSG-RAN WG2#99bis, R2-1710570, Prague, Czech Republic, Oct. 9, 2017, total 2 pages.

NEC:"UL data transmission after cell reselection", 3GPP TSG-RAN WG2 #NR Ad Hoc, R2-1700592, Spokane, USA, Jan. 17, 2017. total 2 pages.

Qualcomm Incorporated:"Report of Email Discussion [NR-AH1801#14][NR] RRC inactive procedures", 3GPP TSG-RAN WG2 Meeting #101, R2-1803585, Athens, Greece, Feb. 26, 2018. total 16 pages.

Huawei, HiSilicon, The content of AS context for inactive UE. 3GPP TSG-RAN WG2#101 Athens, Greece, Feb. 26, 2018, R2-1803268, 3 pages.

Huawei, HiSilicon, Discussion on Inactive Mode for E-UTRA connected to 5GC. 3GPP TSG-RAN WG2 Meeting #99 Berlin, German, Aug. 21, 2017, R2-1708552, 7 pages.

* cited by examiner (a)

(b)

(c)

Protocol stack in the CU

Protocol stack in the CU

Protocol stack in the DU

Protocol stack in the DU (a)

Protocol stack in the CU

Protocol stack in the CU

Protocol stack in the DU

Protocol stack in the DU (b)

METHOD AND DEVICE FOR SENDING UPLINK DATA BY AN INACTIVE TERMINAL

CROSS-REFERENCE TO RELATED APPLICATIONS

This application is a continuation of International Application No. PCT/CN2019/082443, filed on Apr. 12, 2019, which claims priority to Chinese Patent Application No. 201810172450.7, filed on Mar. 1, 2018. The disclosures of the aforementioned applications are hereby incorporated by reference in their entireties.

TECHNICAL FIELD

This application relates to the field of communications technologies, and in particular, to a communication method and a communication apparatus.

BACKGROUND

An inactive state is a radio resource control (RRC) state introduced to a new radio (NR) technology of the 3rd generation partnership project (3GPP).

In a possible manner, in an inactive state, a terminal disconnects an RRC connection of an air interface from an access network device, and the terminal receives downlink data, downlink signaling, and the like at an agreed time-frequency position. For example, the terminal may receive a paging message sent by the access network device. In addition, in the inactive state, the access network device stores an access stratum context of the terminal, and assigns a radio access network notification area (RNA) and an identifier of the terminal in the inactive state to the terminal. The RNA may be used for mobility management of the terminal.

Currently, a technical solution for enabling the terminal in the inactive state to directly send uplink data has not been proposed. The terminal cannot directly send uplink data if it is in an inactive state but needs send the uplink data, causing service delay.

SUMMARY

This application provides a communication method and a communications apparatus, to reduce service delay because a terminal in an inactive state cannot directly send uplink data.

To achieve the foregoing objective, the following technical solutions are used in embodiments of this application:

According to a first aspect, an embodiment of this application provides a communication method. The method may be implemented by a terminal or a chip that may be used in a terminal, and the method includes: A first message is received from a first access network device, then a configured dedicated signaling radio bearer (SRB) is released or suspended, and protocol entities corresponding to a configured data radio bearer (DRB) are reset.

The first message is used to indicate the terminal to enter an RRC inactive state, and the first message carries an identifier of the terminal in the RRC inactive state and RNA information.

According to the method, the terminal may receive, from the first access network device, the first message used to indicate the terminal to enter the inactive state, to release or suspend the configured dedicated SRB, and reset the protocol entities corresponding to the configured DRB. It may be learned that in this embodiment of this application, the terminal retains and resets the DRB and the protocol entities corresponding to the DRB. Therefore, after entering the inactive state, if there is to-be-transmitted uplink data, the terminal may directly process the uplink data on the reset DRB, to reduce a service delay of the terminal.

It should be noted that this embodiment of this application may be applied to NR and another type of radio access network. For example, if this embodiment of this application is applied to a long term evolution (LTE) radio access network, because there is no SDAP entity or SDAP entity in LTE, the protocol entities corresponding to the DRB include a packet data convergence protocol (PDCP) entity, a radio link control (RLC) entity, and a common media access control (MAC) entity. Correspondingly, when performing the reset operation, the terminal needs to reset the PDCP entity, the RLC entity, and the MAC entity.

If this embodiment of this application is applied to a radio access network using an NR technology, because there is an SDAP layer and an SDAP entity in the NR technology, the protocol entities corresponding to the DRB include the PDCP entity, the RLC entity, the MAC entity, and the SDAP entity. Correspondingly, when performing the reset operation, the terminal needs to reset the PDCP entity, the RLC entity, the MAC entity, and the SDAP entity. In this embodiment of this application, the technical solutions are mainly applied to, for example, a network using the NR technology. In other words, an example in which the protocol entities corresponding to the DRB include the PDCP entity, the RLC entity, the MAC entity, and the SDAP entity is used below.

Optionally, the first message carries timing information, and the timing information is used to indicate preset duration.

In a possible design, that a configured dedicated SRB is released or suspended, and protocol entities corresponding to a configured DRB are reset may be specifically implemented as follows: If no scheduling information is received within the preset duration after the first message is received, after the preset duration, the configured dedicated SRB and protocol entities corresponding to the SRB are released or suspended, and the configured dedicated DRB and the protocol entities corresponding to the DRB are reset.

For example, when the solutions in this embodiment of this application are applied to the LTE radio access network, that a configured dedicated SRB is released or suspended, and protocol entities corresponding to a configured DRB are reset may be specifically implemented as follows: If no scheduling information is received within the preset duration after the first message is received, after the preset duration, the configured dedicated SRB and protocol entities corresponding to the SRB are released or suspended, and the configured PDCP entity, RLC entity, and MAC entity are reset.

When the solutions in this embodiment of this application are applied to the NR radio access network, that a configured dedicated SRB is released or suspended, and protocol entities corresponding to a configured DRB are reset may be specifically implemented as follows: If no scheduling information is received within the preset duration after the first message is received, after the preset duration, the configured dedicated SRB and protocol entities corresponding to the SRB are released or suspended, and the configured PDCP entity, RLC entity, MAC entity, and SDAP entity are reset.

It should be noted that, the preset duration is determined based on the timing information carried in the first message, or the preset duration may be a time value pre-stored in the terminal.

In a possible design, that the configured dedicated SRB and protocol entities corresponding to the SRB are released or suspended, and the configured dedicated DRB and the protocol entities corresponding to the DRB are reset may alternatively be implemented as follows:

A cell reselection operation is performed after the first message is received.

If a first cell is reselected within the preset duration, the configured dedicated SRB is released or suspended, and the protocol entities corresponding to the configured DRB are reset. The first cell belongs to a cell indicated by the RNA information, and is different from a cell in which the first message is received.

According to the method, after receiving the first message sent by the first access network device, the terminal does not immediately enter the inactive state, but enters the inactive state only when a specific condition is met. The specific condition includes: The terminal reselects the first cell within the preset duration after receiving the first message; or, within the preset duration after receiving the first message, the terminal neither reselects the first cell nor receives scheduling information. Therefore, after the terminal enters the inactive state, an amount of sent uplink information (including uplink data and uplink information) is reduced, and power consumption of the terminal is reduced.

In a possible design, if there is to-be-transmitted uplink data, the uplink data is transmitted on a DRB corresponding to the uplink data; or if there is to-be-transmitted uplink signaling, the uplink signaling is transmitted on a common signaling radio bearer.

In a possible design, after based on the first message, the configured dedicated SRB and the protocol entities corresponding to the SRB are released or suspended, and the configured dedicated DRB and the protocol entities corresponding to the DRB are reset, the following steps may further be performed:

If a cell covered by a second access network device is reselected to and there is to-be-transmitted uplink information, a second message is sent to the second access network device.

The second message carries the identifier of the terminal in the RRC inactive state and information about a cause for triggering sending of the second message. The cell that is reselected belongs to the cell indicated by the RNA information. It is assumed that a cell covered by the first access network device and on which the terminal initially camps is referred to as a source cell. In this case, the cell that is reselected and the source cell belong to the cell indicated by a same RNA information. In addition, the identifier of the terminal in the RRC inactive state is associated with the first access network device and an architecture of the first access network device. Specifically, the identifier of the terminal in the RRC inactive state may carry an identifier of the first access network device and information about whether the first access network device has a centralized unit (CU)/distributed unit (DU) architecture. Optionally, the second access network device may address the first access network device based on the identifier of the first access network device. The second access network device may determine, based on the CU/DU architecture of the first access network device, whether to migrate an anchor access network device of the terminal.

According to the method, when the terminal reselects the cell covered by the second access network device and there is the to-be-transmitted uplink information, the terminal may send the second message to the second access network device, to trigger the second access network device to determine whether to migrate the anchor access network device of the terminal. The second access network device may determine, based on the architecture of the first access network device and/or the information about the cause for triggering sending of the second message (which is also referred to as cause information in this specification), whether to migrate the anchor access network device of the terminal. Therefore, the anchor access network device of the terminal is migrated only when a condition for triggering migration of the anchor access network device is met, to avoid high signaling overheads caused by frequent migration of the anchor. In addition to reducing the signaling overheads, power consumption of the terminal can also be reduced.

According to a second aspect, an embodiment of this application provides a communication method. The method may be implemented by a first access network device or a chip that may be used in a first access network device. The method includes: A first access network device sends a first message to a terminal, then releases or suspends a configured dedicated signaling radio bearer SRB corresponding to the terminal, and resets protocol entities corresponding to a configured data radio bearer DRB corresponding to the terminal.

The first message is used to indicate the terminal to enter a radio resource control RRC inactive state, and the first message carries an identifier of the terminal in the RRC inactive state and radio access network notification area RNA information.

According to the method, the first access network device sends, to the terminal, the first message used to indicate the terminal to enter the inactive state, to release or suspend the configured dedicated SRB, and reset the protocol entities corresponding to the configured DRB. It may be learned that in this embodiment of this application, the terminal retains and resets the DRB and the protocol entities corresponding to the DRB. Therefore, after entering the inactive state, if there is to-be-transmitted uplink data, the terminal may directly process the uplink data on the reset DRB, to reduce a service delay of the terminal.

With reference to the foregoing descriptions, the protocol entities corresponding to the DRB include a PDCP entity, an RLC entity, a MAC entity, and an SDAP entity, or the protocol entities corresponding to the DRB include a PDCP entity, an RLC entity, and a MAC entity.

In a possible design, that a first access network device releases or suspends a configured dedicated SRB corresponding to the terminal and resets protocol entities corresponding to a configured DRB corresponding to the terminal may be specifically implemented as follows: If no scheduling information is sent to the terminal within preset duration after the first message is sent, after the preset duration, the first access network device releases or suspends the configured dedicated SRB corresponding to the terminal, and resets the protocol entities corresponding to the configured DRB corresponding to the terminal.

In a possible design, that a first access network device releases or suspends a configured dedicated SRB corresponding to the terminal and resets protocol entities corresponding to a configured DRB corresponding to the terminal may alternatively be implemented as follows: If determining, within preset duration after sending the first message, that the terminal reselects a first cell, the first access network device releases or suspends the configured dedicated SRB corresponding to the terminal, and resets the protocol entities corresponding to the configured DRB corresponding to the terminal. This means that within the preset duration, the terminal may also trigger a process of entering the inactive state by reselecting the first cell.

According to this method, after sending the first message to the terminal, the first access network device may set the preset duration. Before the preset duration expires, if the terminal reselects the first cell, the first access network device may indicate to the terminal to enter the inactive state. Alternatively, if the terminal neither reselects the first cell nor receives the scheduling information within the preset duration after receiving the first message, the first access network device may indicate to the terminal to enter the inactive state. Therefore, after the terminal is indicated to enter the inactive state, an amount of uplink information (where the uplink information includes uplink data and uplink information) sent by the terminal is reduced, and power consumption of the terminal is reduced.

In a possible design, if the first access network device includes a CU and a DU, that a first access network device sends a first message to a terminal may be specifically implemented as follows: The first access network device sends the first message to the terminal by using the DU.

In a possible design, the following steps may be performed:

The CU of the first access network device sends a third message to the DU, and then the DU of the first access network device determines related configuration of the radio bearers of the terminal. That the DU determines related configuration of the radio bearers of the terminal may be specifically implemented as follows: The DU releases or suspends the configured SRB corresponding to the terminal and protocol entities that are in the DU and that correspond to the configured SRB, releases or suspends the radio link control RLC protocol entity corresponding to the configured DRB corresponding to the terminal, and resets the common medium access control entity.

Then, after the CU of the first access network device sends the third message to the DU, the CU of the first access network device releases or suspends the configured SRB and protocol entities that are in the CU and that correspond to the configured SRB, resets the configured DRB and protocol entities that are in the CU and that correspond to the configured DRB, and generates the RLC protocol entity corresponding to the DRB.

Alternatively, after the DU determines the related configuration of the radio bearers of the terminal, the DU sends a response message of the third message to the CU; and after receiving the response message of the third message, the CU releases or suspends the configured SRB and protocol entities that are in the CU and that correspond to the configured SRB, resets the configured DRB and protocol entities that are in the CU and that correspond to the configured DRB, and generates the RLC protocol entity corresponding to the DRB.

The third message includes an identifier of the terminal in an RRC connected state. For example, the identifier of the terminal in the RRC connected state is a C-RNTI, and the third message is used to indicate the DU to switch the terminal to the inactive state. The response message of the third message is used to indicate that the DU has processed the radio bearers and protocol entities of the terminal.

According to the method, after the terminal enters the inactive state, the RLC protocol entity corresponding to the DRB of the terminal is deployed in the CU, and the RLC protocol entity that corresponds to the terminal and that is in the DU is released or suspended. In this case, when uplink data arrives, the CU of the first access network device may process uplink data in a MAC SDU format by using the deployed RLC protocol entity, and then sequentially send processed uplink data to the PDCP entity and the SDAP entity for processing. The CU does not need to frequently interact with the DU. This reduces a processing delay.

In a possible design, when it is determined that migration of an entry of the terminal in a core network from the first access network device to a second access network device is not triggered, the following steps may be performed: The first access network device receives uplink information of the terminal forwarded by the second access network device, then processes the uplink information by using a protocol entity corresponding to the uplink information of the terminal.

The uplink information carries the identifier of the terminal in the RRC inactive state.

According to the method, when it is determined that an anchor access network device of the terminal is not migrated, the first access network device exchanges data or signaling with the terminal, to avoid high signaling overheads caused by frequent migration of the anchor access network device, and also reduce power consumption of the terminal.

In a possible design, the uplink information carries verification information corresponding to the terminal. Correspondingly, before the first access network device processes the uplink information by using the protocol entity, the following steps may be performed: The first access network device may verify an identity of the terminal based on the verification information. After the verification succeeds, the first access network device processes the uplink information by using the protocol entity.

In a possible design, the uplink information carries cause information. Correspondingly, the first access network device may determine, based on the cause information, whether an access stratum security key corresponding to the terminal is updated.

In a possible design, when it is determined that migration of the entry of the terminal in the core network from the first access network device to the second access network device is triggered, the following steps may be performed: The first access network device receives a request message that is sent by the second access network device and that is for obtaining a context of the terminal, then sends context information of the terminal to the second access network device.

The request message carries the identifier of the terminal in the RRC inactive state.

According to the method, if the anchor access network device of the terminal needs to be migrated, the second access network device provides a coverage service for the terminal. Because the second access network device is usually relatively close to the terminal or has better quality of service, communication quality of the terminal can be improved.

In a possible design, before that the first access network device receives a request message that is sent by the second access network device and that is for obtaining a context of the terminal, the following step may further be performed: The first access network device sends architecture indication information to the second access network device. The architecture indication information is used to indicate whether the first access network device is an access network device having a CU/DU architecture.

According to this method, the first access network device sends the architecture indication information to the second access network device, to indicate the second access network device to determine, based on an architecture of the first access network device, whether to migrate the anchor access network device of the terminal. If the first access network device has the CU/DU architecture, the anchor of the terminal is migrated to the second access network device, and the uplink information of the terminal is processed by the second access network device, to reduce signaling overheads.

According to a third aspect, an embodiment of this application provides a communication method. The method may be implemented by a second access network device or a chip that may be used in a second access network device. The method includes: A second access network device receives a second message sent by a terminal. If the second access network device determines, based on information about a cause for triggering sending of the second message, to trigger migration of an entry of the terminal in a core network from a first access network device to the second access network device, the second access network device sends a request message for obtaining context information of the terminal to the first access network device. Then, the second access network device receives the context information of the terminal sent by the first access network device.

The second message carries an identifier of the terminal in a radio resource control RRC inactive state and the information about the cause for triggering sending of the second message.

According to this method, the second access network device may receive the second message sent by the terminal, and determine, based on the cause information in the second message, whether to migrate an anchor access network device of the terminal. Therefore, the anchor access network device of the terminal is migrated only when a condition for triggering migration of the anchor access network device is met, to avoid high signaling overheads caused by frequent migration of the anchor. In addition to reducing the signaling overheads, power consumption of the terminal can also be reduced.

In a possible design, after that the second access network device receives the context information of the terminal sent by the first access network device, the following step may further be performed: The second access network device generates, based on the context information of the terminal, protocol entities corresponding to a DRB of the terminal.

According to the method, after determining that the anchor access network device of the terminal needs to be migrated, the second access network device processes uplink information of the terminal, and provides a coverage service for the terminal. Because the second access network device is usually relatively close to the terminal or has better quality of service, communication quality of the terminal can be improved.

With reference to the foregoing descriptions, the protocol entities corresponding to the DRB include a PDCP entity, an RLC entity, a common MAC entity, and an SDAP entity, or the protocol entities corresponding to the DRB include a PDCP entity, an RLC entity, and a common MAC entity.

In a possible design, the cause information includes an uplink buffer status report, a service/slice type to which uplink data belongs, quality of service QoS class information, and network load.

In a possible design, the following steps may be further performed: The second access network device determines whether the first access network device has a centralized unit CU/distributed unit DU architecture. If the first access network device has the CU/DU architecture, the second access network device triggers migration of the entry of the terminal in the core network from the first access network device to the second access network device.

According to the method, if determining that the first access network device has the CU/DU architecture, the second access network device migrates the anchor of the terminal to the second access network device, and the second access network device processes uplink information of the terminal, to reduce signaling overheads.

In a possible design, that the second access network device determines whether the first access network device has a CU/DU architecture may be specifically implemented as follows: The second access network device obtains architecture indication information sent by the first access network device. Then, the second access network device determines, based on the architecture indication information, whether the first access network device has the CU/DU architecture.

For example, that the second access network device obtains the architecture indication information of the first access network device may be specifically implemented as follows: The first access network device sends the architecture indication information to the second access network device. Correspondingly, the second access network device receives the architecture indication information.

That the second access network device determines whether the first access network device has a CU/DU architecture may alternatively be implemented as follows: The second access network device determines, based on the identifier of the terminal in the RRC inactive state, whether the first access network device has the CU/DU architecture.

In a possible design, the following step may further be performed: If the second access network device determines, based on the cause information, not to trigger migration of the entry of the terminal in the core network from the first access network device to the second access network device, the second access network device sends uplink information to the first access network device.

According to the method, when determining that the anchor access network device of the terminal is not migrated, the second access network device indicates the first access network device to process the uplink information of the terminal, to exchange data or signaling with the terminal. Therefore, high signaling overheads caused by frequent migration of the anchor access network device are avoided, and power consumption of the terminal is also reduced.

According to a fourth aspect, an embodiment of this application provides a communications apparatus. The apparatus has functions of implementing the method according to the first aspect. The functions may be implemented by hardware, or may be implemented by hardware executing corresponding software. The hardware or the software includes one or more modules corresponding to the foregoing functions. For example, the apparatus may be a terminal, or may be a chip that may be used in a terminal.

In a possible design, the apparatus is a terminal, and the terminal includes a processor. The processor is configured to support the terminal in performing corresponding functions in the foregoing methods. Further, the terminal may further include a transmitter and a receiver. The transmitter and the receiver are configured to support communication between the terminal and a network side device. Further, the terminal may further include a memory. The memory is configured to: be coupled to the processor, and store a program instruction and data that are necessary for the terminal. The network side device herein includes but is not limited to a first access network device and a second access network device.

According to a fifth aspect, an embodiment of this application provides a communications apparatus. The apparatus has functions of implementing the method according to the second aspect. The functions may be implemented by hardware, or may be implemented by hardware executing corresponding software. The hardware or the software includes one or more modules corresponding to the foregoing functions. For example, the apparatus may be a base station, or may be a chip that may be used in a base station.

In a possible design, the apparatus is a base station, and the base station includes a processor. The processor is configured to support the base station in performing corresponding functions in the foregoing methods. Further, the base station may further include a transmitter and a receiver. The transmitter and the receiver are configured to support communication between the base station and a terminal. Further, the base station may further include a memory. The memory is configured to: be coupled to the processor, and store a program instruction and data that are necessary for the base station.

According to a sixth aspect, an embodiment of this application provides a communications apparatus. The apparatus has functions of implementing the method according to the third aspect. The functions may be implemented by hardware, or may be implemented by hardware executing corresponding software. The hardware or the software includes one or more modules corresponding to the foregoing functions. For example, the apparatus may be a base station, or may be a chip that may be used in a base station.

In a possible design, the apparatus is a base station, and the base station includes a processor. The processor is configured to support the base station in performing corresponding functions in the foregoing methods. Further, the base station may further include a transmitter and a receiver. The transmitter and the receiver are configured to support communication between the base station and a terminal, or communication between base stations. Further, the base station may further include a memory. The memory is configured to: be coupled to the processor, and store a program instruction and data that are necessary for the base station.

According to a seventh aspect, an embodiment of this application provides a communications system. The system includes the terminal, the first access network device, and the second access network device in the foregoing aspects.

According to an eighth aspect, an embodiment of this application provides a computer-readable storage medium. The computer-readable storage medium stores an instruction. When the instruction is run on a computer, the computer is enabled to perform the method according to the first aspect, the second aspect, or the third aspect.

According to a ninth aspect, an embodiment of this application provides a computer program product including an instruction. When the computer program product runs on a computer, the computer is enabled to perform the method according to the first aspect, the second aspect, or the third aspect.

According to a tenth aspect, an embodiment of this application provides a chip system, applied to a terminal. The chip system includes at least one processor, a memory, and an interface circuit. The memory, the transceiver, and the at least one processor are connected to each other by using a line, and the at least one memory stores an instruction. The instruction is executed by the processor, to perform the method according to the first aspect.

According to an eleventh aspect, an embodiment of this application provides a chip system, applied to a network side device. For example, the chip system is applied to a first access network device. The chip system includes at least one processor, a memory, and an interface circuit. The memory, the transceiver, and the at least one processor are connected to each other by using a line, and the at least one memory stores an instruction. The instruction is executed by the processor, to perform the method according to the second aspect.

According to a twelfth aspect, an embodiment of this application provides a chip system, applied to a network side device. For example, the chip system is applied to a second access network device. The chip system includes at least one processor, a memory, and an interface circuit. The memory, the transceiver, and the at least one processor are connected to each other by using a line, and the at least one memory stores an instruction. The instruction is executed by the processor, to perform the method according to the third aspect.

According to the solutions in the embodiments of this application, the terminal receives, from the first access network device, the first message used to indicate the terminal to enter the inactive state, to release or suspend the configured dedicated SRB, and reset the protocol entities corresponding to the configured DRB. In other words, in the embodiments of this application, the DRB on which the uplink data may be directly processed is provided. Therefore, when the terminal has to-be-transmitted uplink data, the terminal may directly process the uplink data on the reset DRB, to reduce a service delay of the terminal.

DESCRIPTION OF EMBODIMENTS

System architectures and service scenarios are described in this application to more clearly describe the technical solutions in this application, but are not intended to limit the technical solutions provided in this application. A person of ordinary skill in the art may know that as the system architectures evolve and a new service scenario emerges, the technical solutions provided in this application are also applicable to a similar technical problem.

It should be noted that, in this application, the nouns such as "illustratively" or "for example" is used to represent giving an example, an illustration, or a description. Any embodiment or design scheme described as "illustratively" or "for example" in this application should not be explained as being more preferred or having more advantages than another embodiment or design scheme. Exactly, use of the nouns such as "illustratively" or "for example" is intended to present a relative concept in a specific manner.

In this application, "of", "corresponding (relevant)", and "corresponding" may be interchangeably used sometimes. It should be pointed out that, consistent meanings are expressed when differences are not emphasized.

The embodiments of this application are applied to NR and other types of radio access networks.

Figure 1A:
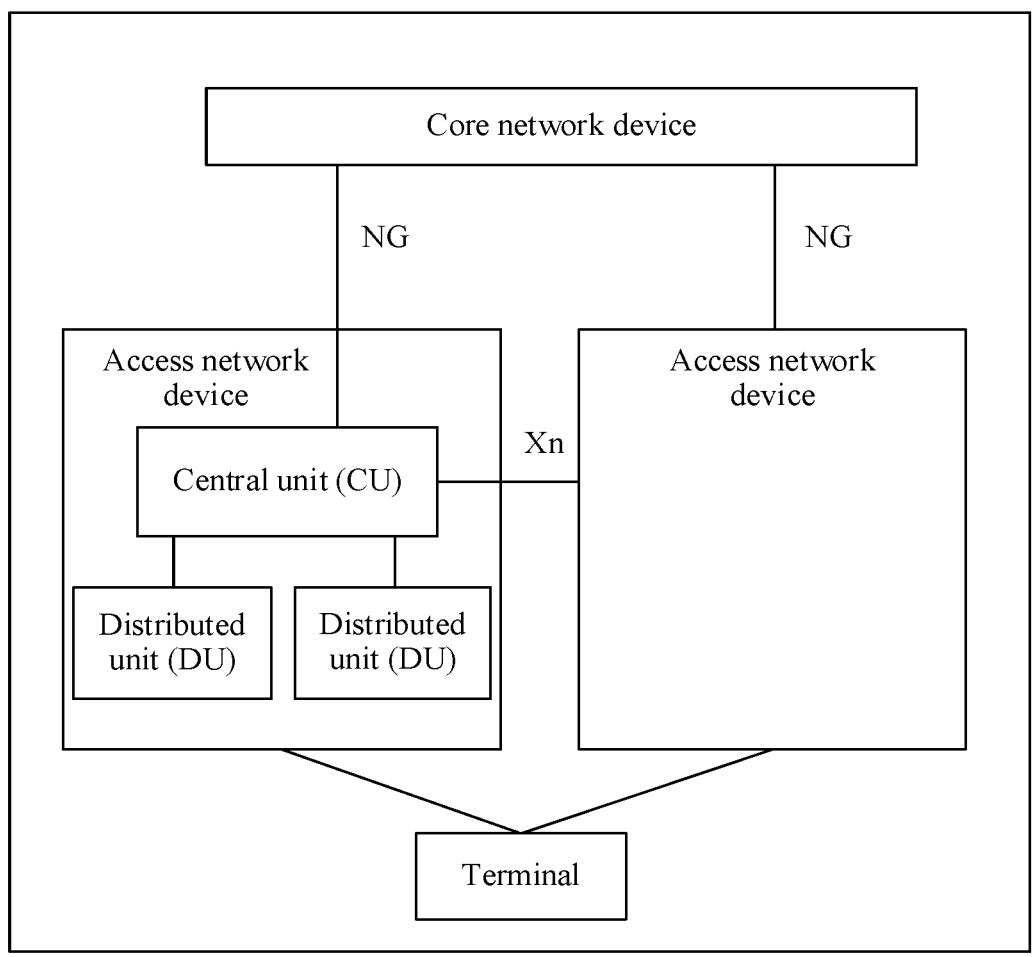
FIG. 1a is a schematic structural diagram of a communications system according to an embodiment of this application.

FIG. 1*a* is a schematic diagram of a possible communications system in this application. The communications system may include at least one core network device (where only one core network device is shown in the figure), one or more access network devices that communicate with the core network device and a terminal, and the terminal that accesses a core network by using an access network device.

The core network device in this application is an apparatus that is deployed in a core network and configured to provide a service for a terminal. The core network device described in this application includes but is not limited to: an access and mobility management function (AMF), a session management function (SMF), a user plane function (UPF), a policy and charging rules function (PCRF), and a device combining the access and mobility management function, the session management function, the user plane function, and the policy and charging rules function. In systems using different radio access technologies, core network devices having a similar wireless communication function may have different names. For ease of description only, in the embodiments of this application, the foregoing apparatuses that can provide a service for the terminal are collectively referred to as a core network device.

The access network device described in this application is an apparatus that is deployed in a radio access network and configured to provide a wireless communication function for a terminal. The access network device in this application includes but is not limited to macro base stations, micro base stations (which is also referred to as a small cell), relay stations, transmission reception points (TRP), gNodeBs (gNB), next generation evolved NodeBs (ng-eNB), and the like that are in various forms, may further include a wireless access network device in a non-3GPP system such as a wireless local area network (WLAN) access device. In systems using different radio access technologies, radio access network devices having a similar wireless communication function may have different names. For ease of description only, in the embodiments of this application, the foregoing apparatuses that can provide a wireless communication function for the terminal are collectively referred to as an access network device.

The terminal described in this application is a device having a wireless transceiver function, and may be deployed on land, and includes an indoor device, an outdoor device, a handheld device, or a vehicle-mounted device; or may be deployed on a water surface (such as on a ship); or may be deployed in air (such as in an aircraft, a balloon, and a satellite). The terminal may include various types of mobile phones, tablets (Pads), computers having a wireless transceiver function, wireless data cards, virtual reality (VR) terminal devices, augmented reality (AR) terminal devices, and machine-type communication (MTC) terminal devices, a terminal device in industrial control, a terminal device in self-driving, a terminal device in telemedicine (remote medical), a terminal device in a smart grid, a terminal device in transportation safety, a terminal device in a smart city, a wearable device (such as a smartwatch, a smart band, or a pedometer), and the like. In systems using different radio access technologies, names of terminals having similar wireless communication functions may be different. Only for ease of description, in the embodiments of this application, the foregoing apparatuses having the wireless transceiver communication function are collectively referred to as a terminal.

In the communications system in the embodiments of this application, the access network device may communicate with the core network device via an NG interface, and the access network devices may communicate with each other via an Xn interface. It may be understood that the access network device may alternatively communicate with the core network device via another type of interface. Similarly, the access network devices may alternatively communicate with each other via another type of interface. This is not limited in the embodiments of this application.

In the following descriptions, a base station is used as an example to describe the access network device in the embodiments of this application.

Figure 1B:
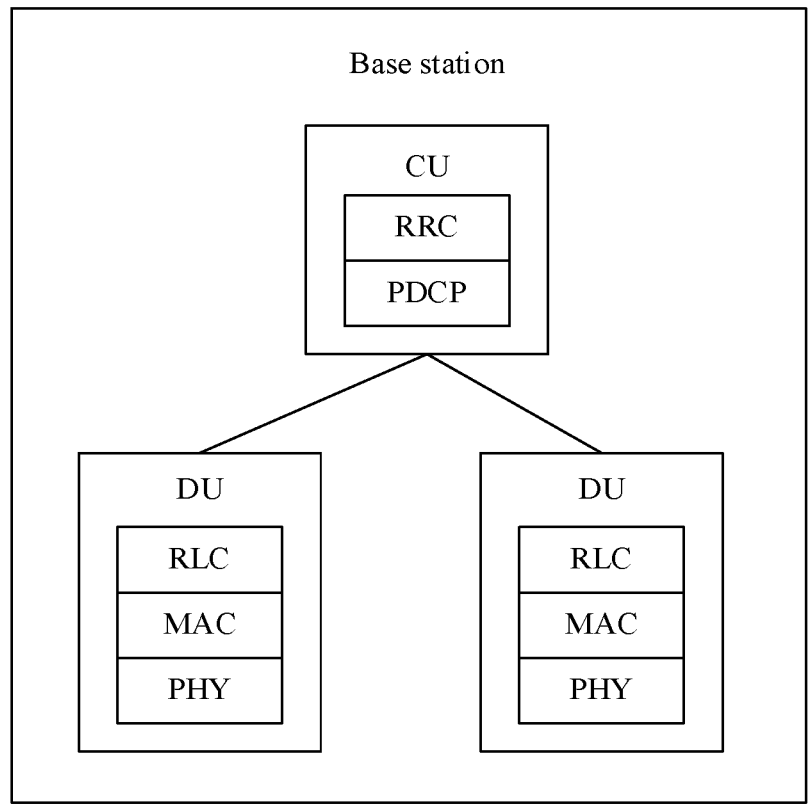
FIG. 1b is a schematic structural diagram of a base station according to an embodiment of this application.

As shown in FIG. 1*b*, in a possible manner, a base station may include a centralized unit (CU) and a distributed unit (DU). One CU may be connected to one DU. Alternatively, a plurality of DUs may share one CU, to reduce costs, and facilitate expanding a network. The CU and the DU may be split based on a protocol stack. In a possible manner, a radio resource control (RRC) layer, a service data adaption protocol (SDAP) layer, and a PDCP layer are deployed in the CU, and remaining RLC layer, MAC layer, and physical layer (PHY layer) are deployed in the CU.

In the embodiments of this application, the foregoing method for splitting the protocol stack is not completely limited, and there may be another splitting method. When a network device has, for example, a CU/DU architecture in FIG. 1*b*. The access network device in the embodiments of this application may be a CU, a DU, or a system including a CU and a DU, and specifically depends on a corresponding implementation function.

It may be understood that the base station in the embodiments of this application is not limited to the form in FIG. 1*b*, and may be any apparatus that is deployed in a radio access network and that is configured to provide a wireless communication function for a terminal.

The method in the embodiments of this application is mainly applied to a radio access network. To be specific, the method in the embodiments of this application is mainly applied to an access network system that includes an access network device and a terminal. The communications system including the terminal, the access network device, and the core network device includes the access network system.

Terms used in the embodiments of this application are described below.

Context information of the terminal is all information used to represent an identity, a background, and a status of the terminal. For example, the context information of the terminal includes but is not limited to position information of the terminal, a terminal identifier, and configuration information of a dedicated radio bearer. The access network device may generate, based on the context information of the terminal, protocol entities corresponding to the terminal, and process data or signaling of the terminal by using the corresponding protocol entities.

An anchor access network device is configured to maintain a context of the terminal. When the terminal moves, the anchor access network device may be migrated. For example, the terminal initially camps on a first access network device, and the first access network device stores and maintains the context information of the terminal. Then, a position of the terminal changes, and a current serving access network device of the terminal is a second access network device. If it is determined to migrate an entry of the terminal in a core network is migrated from the first access network device to the second access network device, the context information of the terminal maintained by the first access network device needs to be transmitted to the second access network device, so that the second access network device processes the data or signaling of the terminal based on the obtained context information of the terminal, and interact with the terminal based on the context information.

Figure 2:
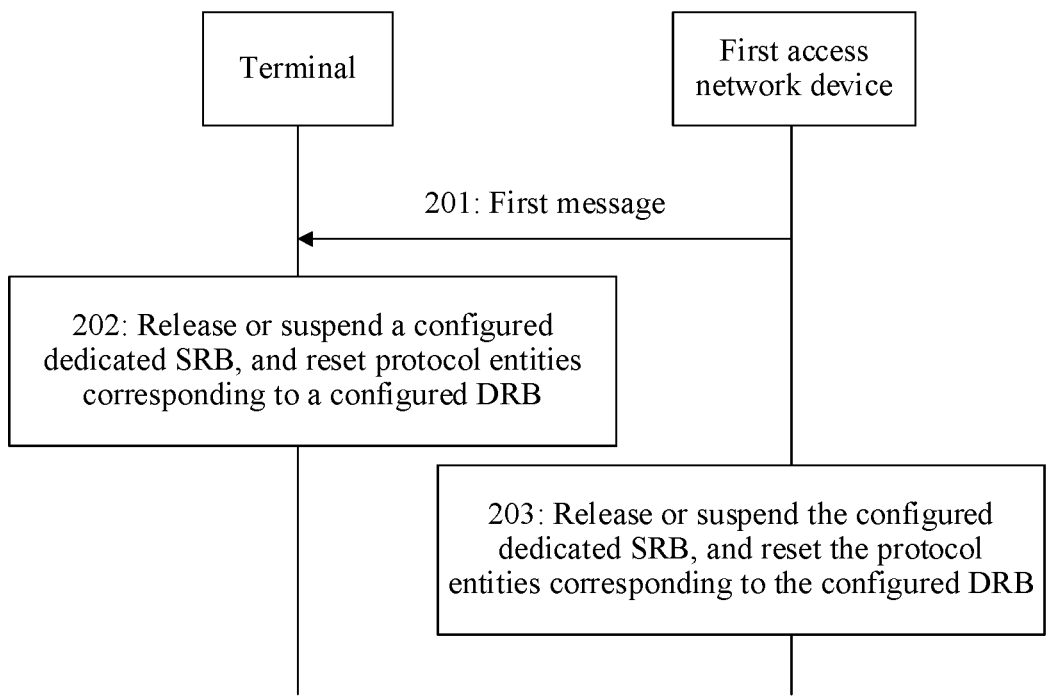
FIG. 2 is a flowchart of a communication method according to an embodiment of this application.

With reference to the communications system shown in FIG. 1a and the base station shown in FIG. 1b, an embodiment of this application provides a communication method. As shown in FIG. 2, the method includes the following steps.

S201: A first access network device sends a first message to a terminal.

Correspondingly, the terminal receives the first message sent by the first access network device.

The first message is used to indicate the terminal to enter an RRC inactive state, and the first message carries an identifier of the terminal in the RRC inactive state and RNA information.

Optionally, the identifier of the terminal in the RRC inactive state may be an inactive-radio network temporary identifier (inactive-Radio Network Temporary Identifier, I-RNTI) of the terminal. The RNA information is used to indicate an RNA, and the access network device may assign the RNA to the terminal. One RNA usually includes at least one cell. In an example of the solutions, the RNA information may be a cell identifier list. It may be understood that, when a position of the terminal changes, if the terminal is currently within a range included in the RNA, the terminal may not send current position information to the access network device; and if the terminal currently moves out of the range included in the RNA, to manage the position of the terminal, the terminal needs to send current position information to the access network device. In addition, if the terminal does not move out of the range included in the RNA, but after preset duration expires, the terminal also needs to send current position information to the access network device. For example, cells covered by the first access network device are a cell 1 to a cell 3, and cells covered by a second access network device are a cell 4 and a cell 5. It is assumed that the terminal initially accesses the cell 1 covered by the first access network device, and the first access network device assigns an RNA_1 to the terminal. The RNA_1 includes the cell 1 to the cell 3. When the terminal moves to a coverage area of the cell 2 or the cell 3, because the terminal does not move out of a coverage area of the RNA_1, the terminal may not report current position information to the access network device. When the terminal moves to the cell 4, the cell 5, or a cell 6, because the terminal has moved out of the coverage area of the RNA_1, the terminal needs to report current position information to the access network device.

It may be understood that the first access network device may detect a data transmission status of the terminal. When detecting that the terminal does not transmit data within a period of time, the first access network device may send the first message to the terminal, to indicate the terminal to enter the inactive state. Alternatively, the terminal detects a data transmission status of the terminal. When detecting that the terminal does not transmit data within a period of time, the terminal initiates a request for entering the inactive state to the first access network device. After receiving the request of the terminal, the first access network device sends the first message to the terminal, to indicate the terminal to enter the inactive state.

Optionally, when the first access network device is a base station having a CU/DU architecture, for example, when the first access network device is the base station shown in FIG. 1b, the first access network device generates the first message by using a CU, and sends the first message to the terminal by using a DU.

S202: The terminal releases or suspends a configured dedicated signaling radio bearer (SRB), and resets protocol entities corresponding to a configured data radio bearer (DRB).

It should be noted that this embodiment of this application may be applied to NR and another type of radio access network. For example, if this embodiment of this application is applied to an LTE radio access network, because there is no SDAP entity or SDAP entity in LTE, the protocol entities corresponding to the DRB include a packet data convergence protocol (PDCP) entity, a radio link control (RLC) entity, and a common media access control MAC entity. Correspondingly, when performing the reset operation, the terminal needs to reset the PDCP entity, the RLC entity, and the MAC entity.

If this embodiment of this application is applied to a radio access network using an NR technology, because there is an SDAP layer and an SDAP entity in the NR technology, the protocol entities corresponding to the DRB include the PDCP entity, the RLC entity, the MAC entity, and the SDAP entity. Correspondingly, when performing the reset operation, the terminal needs to reset the PDCP entity, the RLC entity, the MAC entity, and the SDAP entity.

The solutions in this embodiment of this application is mainly described below by using an example in which this embodiment of this application is applied to a radio access network using an NR technology. In other words, the protocol entities corresponding to the DRB include, for example, the PDCP entity, the RLC entity, the MAC entity, and the SDAP entity.

After receiving the first message, the terminal may perform the following operations.

Step 1: Release or suspend the configured dedicated SRB.

In a 3GPP protocol, SRBs include the dedicated SRB and a common SRB. The dedicated SRB is a signaling radio bearer on which transmission is performed in an acknowledged mode (AM), and the dedicated SRB includes but is not limited to an SRB 1, an SRB 2, and an SRB 3. The common SRB includes but is not limited to an SRB 0 in a transparent mode (TM). In this embodiment of this application, after receiving the first message, the terminal releases or suspends the dedicated SRB.

Specifically, the terminal releases or suspends protocol entities corresponding to the dedicated SRB. The protocol entities corresponding to the dedicated SRB include but are not limited to the RRC entity, the PDCP entity, and the RLC entity. "Release" means that the radio bearers and/or related function of the protocol entities are disabled or removed. To be specific, after the release operation, the terminal cannot process uplink signaling by using the related functions of the protocol entities, or transmit processed uplink signaling on the dedicated SRB. "Suspend" means that the radio bearers and/or the protocol entities, and corresponding configuration information are retained, but processing of corresponding protocol data by using the radio bearers and/or the protocol entities, and the corresponding information is suspended, and running of a corresponding timer, a corresponding counter, and the like is suspended.

If the dedicated SRB corresponds to a plurality of logical channels, the terminal needs to reset corresponding entities corresponding to the dedicated SRB. For example, the dedicated SRB is a split radio bearer. In other words, one dedicated SRB corresponds to two logical channels. If each logical channel corresponds to one RLC entity, in other words, the dedicated SRB corresponds to two RLC entities, the terminal needs to reset the two RLC entities corresponding to the dedicated SRB.

Certainly, after releasing or suspending the configured dedicated SRB, the terminal may exchange signaling with the first access network device on the SRB 0.

Step 2: The terminal resets the protocol entities corresponding to the configured DRB (namely, the configured DRB).

For example, this embodiment of this application is applied to NR, and the protocol entities corresponding to the DRB include the PDCP entity, the RLC entity, the MAC entity, and the SDAP entity.

One SDAP entity corresponds to one packet data unit (PDU) session of the terminal, and one PDU session corresponds to one or more DRBs. For example, if the configured DRB is a split radio bearer, assuming that one DRB corresponds to two logical channels, and each logical channel corresponds to one RLC entity, in other words, the DRB corresponds to two RLC entities, the terminal needs to reset the two RLC entities corresponding to the configured DRB. Correspondingly, the terminal needs to reset other related protocol entities corresponding to the two logical channels.

It should be noted that a time sequence of performing step 1 and step 2 is not limited. For example, the terminal may first perform step 1 and then perform step 2, or may simultaneously perform step 1 and step 2. This is not limited in this embodiment of this application.

It may be understood that, after the two steps included in S202 are performed, the terminal enters the inactive state. In the inactive state, the terminal enters an energy saving state. However, the terminal may perform operations such as monitoring a paging channel, so that the terminal can be addressed when the access network device needs to transmit downlink data.

In this case, after receiving uplink data, the terminal in the inactive state may map the uplink data from a quality of service (QoS) flow to the DRB by using the SDAP entity, and send processed data to the corresponding PDCP entity. The PDCP entity compresses and encrypts the data, and sends the compressed and encrypted data to the RLC entity. The RLC entity performs operations such as segmentation on the data, and sends the segmented data to the MAC entity. The MAC entity performs operations such as multiplexing. Then, the physical layer protocol entity transmits the uplink data processed by the entities.

Figure 3:
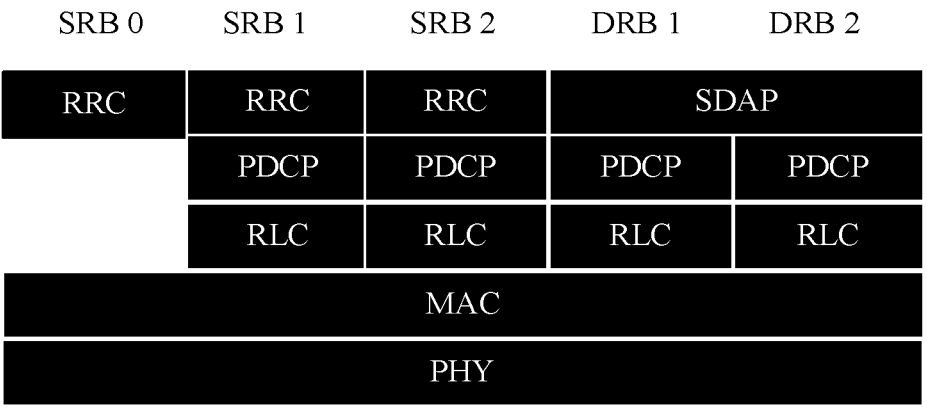
FIG. 3 is a schematic diagram of a protocol stack according to an embodiment of this application.
Figure 3:
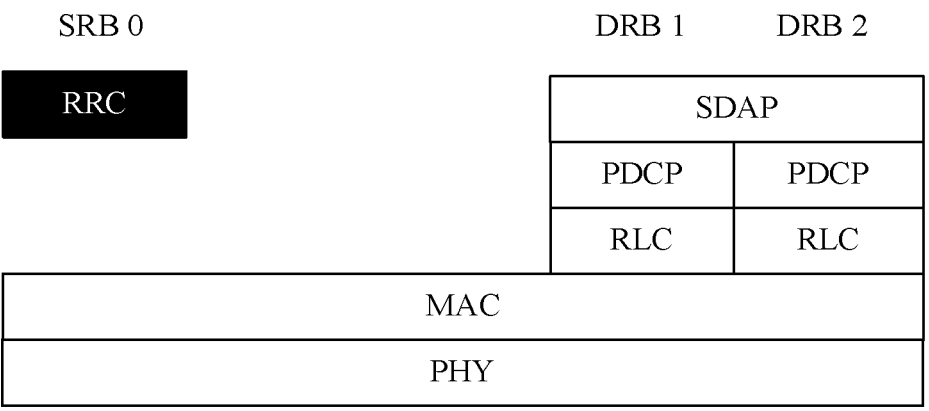
Figure 3:
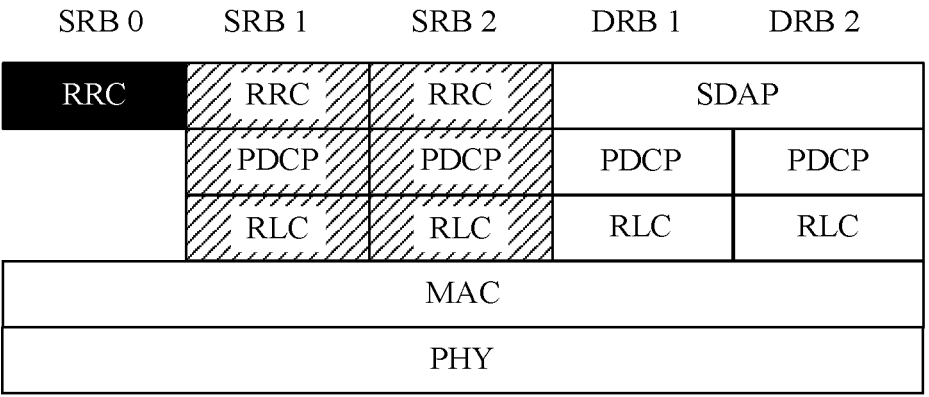

For example, before the terminal receives the first message, as shown in (a) in FIG. 3, the terminal is configured with four dedicated radio bearers and one common SRB. The four dedicated radio bearers include the SRB 1, the SRB 2, a DRB 1, and a DRB 2, and the common SRB is the SRB 0. The SRB 0 corresponds to an RRC layer protocol entity, and protocol entities corresponding to the SRB 1 include the RRC entity, a PDCP entity, and an RLC entity. Protocol entities corresponding to the SRB 2 include the RRC entity, a PDCP entity, and an RLC entity. Protocol entities corresponding to the DRB 1 include an SDAP entity, a PDCP entity, an RLC entity, and a common MAC layer. Protocol entities corresponding to the DRB 2 include the SDAP entity, a PDCP entity, an RLC entity, and the common MAC layer. The DRB 1 and the DRB 2 share the SDAP entity. The terminal is further configured with a PHY entity.

After the terminal receives the first message, a protocol stack of the terminal is shown in (b) in FIG. 3 or (c) in FIG. 3. Correspondingly, operations performed by the terminal may include the following two cases.

Case 1:

As shown in (b) in FIG. 3, the terminal releases the SRB 1 and the SRB 2. Specifically, the terminal releases the RRC entity, the PDCP entity, and the RLC entity that correspond to each of the SRB 1 and the SRB 2. In addition, the terminal further resets the DRB 1 and the DRB 2 shown in (b) in FIG. 3, and the SDAP entity, the PDCP entity, the RLC entity, and the MAC entity that correspond to each of the DRB 1 and the DRB 2.

It should be noted that parts filled with white in FIG. 3 indicate that the corresponding protocol entities are reset. Therefore, the terminal can process the uplink data by using the protocol entities corresponding to the DRB 1 and the DRB 2 in a reset state. Optionally, the PHY entity is also reset, so that the PHY entity transmits processed uplink data. In addition, the PHY entity may be in another state in which the PHY entity may transmit uplink information (including the uplink data and uplink signaling). This is not limited in this embodiment of this application.

In this case, if the terminal has to-be-transmitted uplink data, in a possible implementation, the terminal may process the uplink data by using the protocol entities corresponding to the DRB. For example, the terminal may map the uplink data from the QoS flow to the DRB on by using the SDAP entity, and send the processed data to the PDCP entity. The PDCP entity compresses and encrypts the data, and sends the compressed and encrypted data to the RLC entity. The RLC entity performs operations such as segmentation on the data. Then, the terminal sends the segmented data to the MAC entity. The MAC entity performs operations such as multiplexing. Then, the PHY entity transmits the processed uplink data.

If the terminal has to-be-transmitted uplink signaling, in a possible implementation, the terminal may process the to-be-transmitted uplink signaling on the SRB 0. Specifically, the terminal may process the to-be-transmitted uplink signaling sequentially by using the RRC protocol entity and the MAC entity that correspond to the SRB 0, and then transmit processed uplink signaling by using the PHY entity.

Case 2:

As shown in (c) in FIG. 3, the terminal suspends the SRB 1 and the SRB 2. Specifically, the terminal suspends the RRC entity, the PDCP entity, and the RLC entity that correspond to each of the SRB 1 and the SRB 2. The terminal resets the SDAP entity, the PDCP entity, the RLC entity, and the MAC entity that correspond to each of the DRB 1 and the DRB 2.

It should be noted that shaded parts in (c) in FIG. 3 indicate that the corresponding protocol entities are suspended.

In this case, if the terminal has to-be-transmitted uplink data, the terminal processes the uplink data on a DRB corresponding to the uplink data. If the terminal has to-be-transmitted uplink signaling, the terminal processes the uplink signaling on the SRB 0.

Correspondingly, after sending the first message, the first access network device also needs to perform corresponding operations on a corresponding bearer and protocol entities corresponding to the bearer. That is, the terminal performs S202. Correspondingly, the first access network device performs S203.

S203: The first access network device releases or suspends the dedicated SRB configured for the terminal. The dedicated SRB includes but is not limited to the SRB 1, the SRB 2, and the SRB 3. In a possible implementation, the terminal may transmit signaling with the first access network device on the common SRB (for example, the SRB 0). In addition, the first access network device resets the protocol entities corresponding to the DRB configured for the terminal, so that the terminal can transmit uplink data on the DRB.

It may be understood that the terminal or the access network device may perform some or all of the steps in the foregoing embodiment. These steps or operations are merely examples. In this embodiment of this application, another operation or variations of various operations may further be performed. In addition, the steps may be performed in a sequence different from that presented in the foregoing embodiment, and possibly, not all operations in the foregoing embodiment need to be performed.

According to the communication method in this embodiment of this application, the terminal receives, from the first access network device, the first message used to indicate the terminal to enter the inactive state, to release or suspend the configured dedicated SRB, and reset the protocol entities corresponding to the configured DRB. It may be learned that in this embodiment of this application, the terminal retains and resets the DRB and the protocol entities corresponding to the DRB. Therefore, after entering the inactive state, if there is to-be-transmitted uplink data, the terminal may directly process the uplink data on the reset DRB, to reduce a service delay of the terminal.

Figure 4:
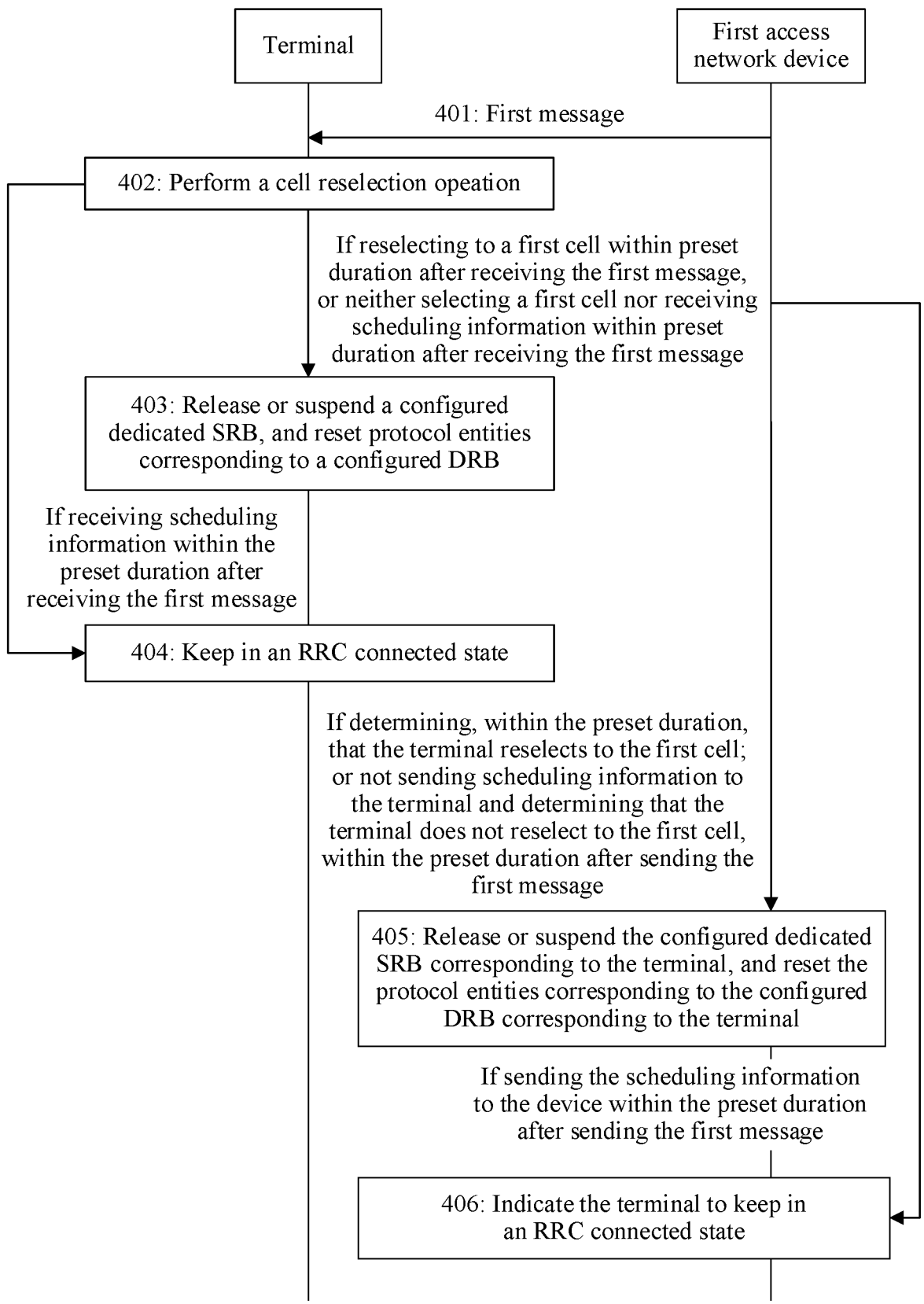
FIG. 4 is a flowchart of a communication method according to an embodiment of this application.

With reference to the method shown in FIG. 2, optionally, in an implementation provided in the embodiments of this application, after receiving the first message, the terminal does not immediately enter the inactive state, but enters the inactive state only when a specific condition is met. Based on this, an embodiment of this application further provides a communication method. As shown in FIG. 4, the method includes S401 to S406.

S401: A first access network device sends a first message to a terminal.

Correspondingly, the terminal receives the first message sent by the first access network device.

The first message is used to indicate the terminal to enter an RRC inactive state, and the first message carries an identifier of the terminal in the RRC inactive state and RNA information.

It may be understood that the first access network device may detect a data transmission status of the terminal. When detecting that the terminal does not transmit data within a period of time, the first access network device may send the first message to the terminal, to indicate the terminal to enter the inactive state. Alternatively, the terminal detects a data transmission status of the terminal. When detecting that the terminal does not transmit data within a period of time, the terminal initiates a request for entering the inactive state to the first access network device. After receiving the request of the terminal, the first access network device sends the first message to the terminal, to indicate the terminal to enter the inactive state.

S402: The terminal performs a cell reselection operation.

After receiving the first message, the terminal performs the cell reselection operation, so that the terminal may reselect to another cell.

If reselecting a first cell within preset duration after receiving the first message, the terminal performs S403.

The first cell belongs to a cell indicated by the RNA information, and is different from a cell in which the terminal receives the first message. It is assumed that the cell in which the terminal receives the first message is referred to as a source cell. After the cell reselection, the terminal reselects the first cell. Therefore, the first cell and the source cell are not a same cell. The preset duration is used to specify timing duration of a timer. The preset duration may be set based on actual application. For example, the preset duration may be set to 100 ms.

Alternatively, if the terminal neither reselects the first cell nor receives scheduling information within the preset duration after receiving the first message, the terminal performs step S403 after the preset duration. If the terminal receives scheduling information within the preset duration after receiving the first message, the terminal performs step S404.

In an example of an implementation, optionally, the first message in S401 carries timing information, and the timing information is used to indicate the preset duration. In this case, after receiving the first message, the terminal starts the timer, and sets the timing duration of the timer to the preset duration carried in the first message. If the terminal does not receive the scheduling information of the first access network device before the timer expires, to reduce power consumption, the terminal may perform the procedure shown in S403, to enter the inactive state.

In another implementation, after receiving the first message, the terminal directly starts the timer even if the first message does not carry the timing information, and sets the timing duration of the timer to the preset duration.

S403: The terminal releases or suspends a configured dedicated SRB, and resets protocol entities corresponding to a configured DRB.

S404: The terminal keeps in an RRC connected state.

It may be understood that, if the terminal receives, before the timer expires, the scheduling information sent by the first access network device, it indicates that the terminal needs to transmit data or signaling. In this case, the terminal stops the timer and stops the cell reselection operation, and keeps in the RRC connected state, so that the terminal transmits the data or signaling based on the scheduling information sent by the first access network device.

Correspondingly, after sending the first message, the first access network device also starts a timer. If the first access network device determines, within the preset duration (in other words, before the timer expires) after sending the first message, that the terminal reselects the first cell, the first access network device performs S405. Alternatively, within the preset duration after sending the first message, if the first access network device does not send the scheduling information to the terminal and determines that the terminal does not reselect to the first cell, the first access network device performs step S405 after the preset duration. If the first access network device sends the scheduling information to the terminal within the preset duration after sending the first message, the first access network device performs step S406.

S405: The first access network device releases or suspends the configured dedicated SRB corresponding to the terminal, and resets the protocol entities corresponding to the configured DRB corresponding to the terminal.

S406: The first access network device indicates the terminal to keep in the RRC connected state.

According to the communication method provided in this embodiment of this application, after receiving the first message sent by the first access network device, the terminal does not immediately enter the inactive state, but enters the inactive state only when a specific condition is met. The specific condition includes: The terminal reselects the first cell within the preset duration after receiving the first message; or, within the preset duration after receiving the first message, the terminal neither reselects the first cell nor receives scheduling information. Therefore, after the terminal enters the inactive state, an amount of sent uplink information (including uplink data and uplink information) is reduced, and power consumption of the terminal is reduced.

It may be understood that the terminal or the first access network device may perform some or all of the steps in the foregoing embodiment. These steps or operations are merely examples. In this embodiment of this application, another operation or variations of various operations may further be performed. In addition, the steps may be performed in a sequence different from that presented in the foregoing embodiment, and possibly, not all operations in the foregoing embodiment need to be performed.

Figure 5A:
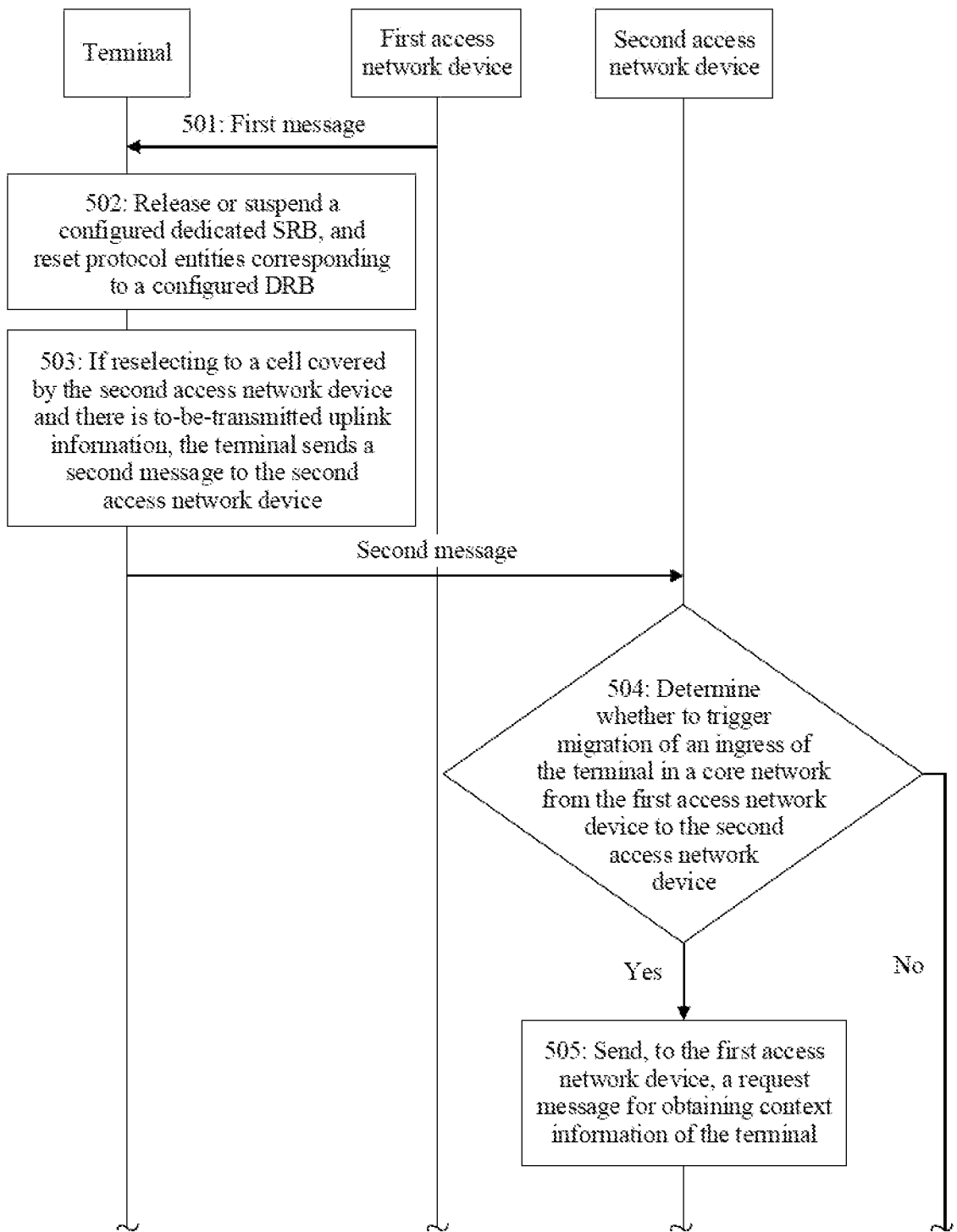
FIG. 5A and FIG. 5B are a flowchart of a communication method according to an embodiment of this application.
Figure 5B:
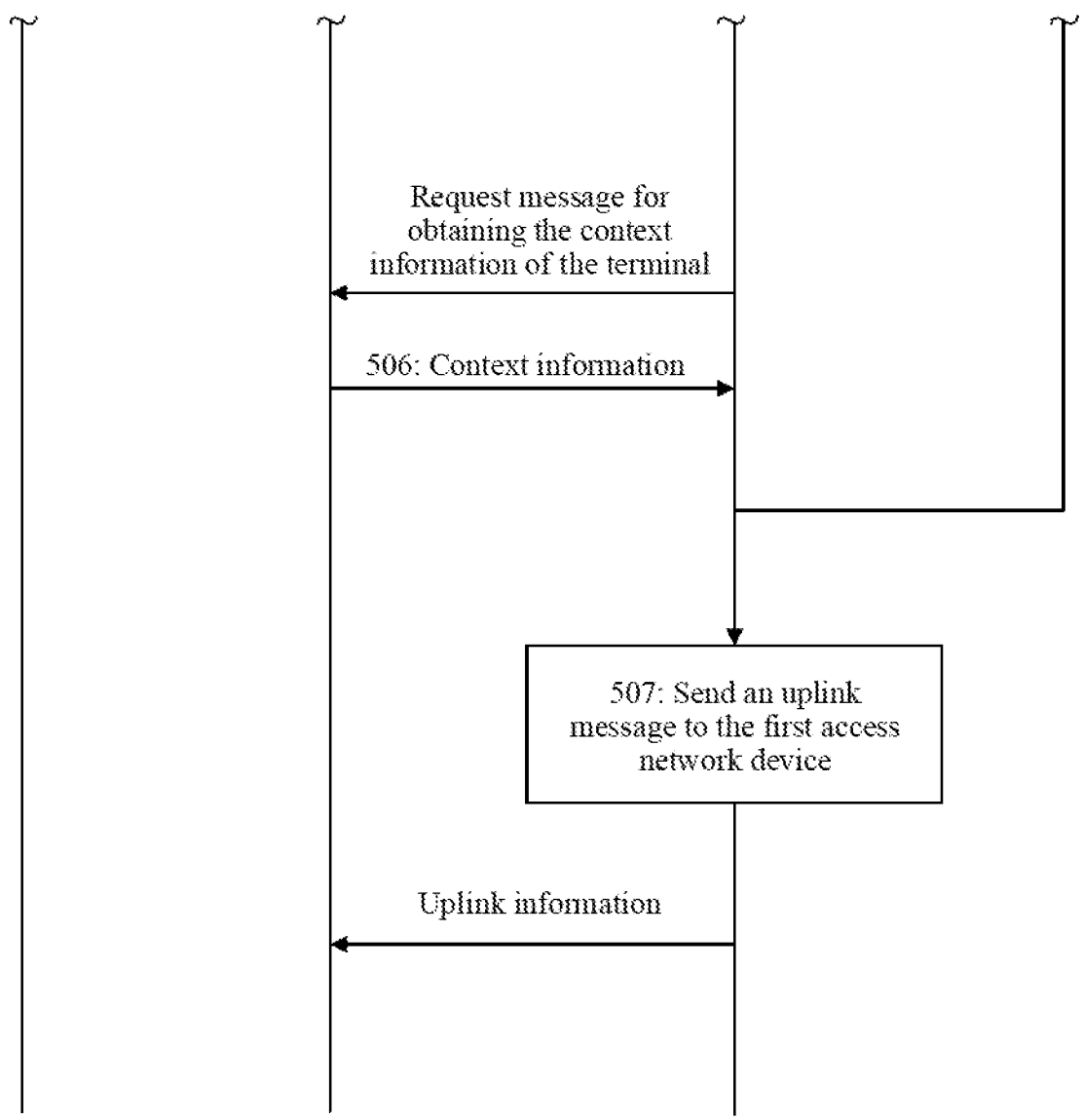

With reference to the method corresponding to FIG. 2 or FIG. 4, after the terminal in the inactive state moves to a cell covered by a second access network device, a new anchor access network device of the terminal needs to be determined, so that the terminal exchanges uplink and downlink information with the new anchor access network device. Based on this, an embodiment of this application further provides a communication method. As shown in FIG. 5A and FIG. 5B, the method includes S501 to S506.

S501 is the same as to S201, and S502 is the same as S202. Details are not described herein again.

S503: If reselecting a cell covered by a second access network device and there is to-be-transmitted uplink information, the terminal sends a second message to the second access network device.

Correspondingly, the second access network device receives the second message sent by the terminal.

The cell that is reselected belongs to a cell indicated by RNA information. In other words, a cell covered by the first access network device and the cell that is reselected belong to a same RNA.

The uplink information includes uplink data and uplink signaling. The uplink signaling includes but is not limited to a paging response message, an RNA update message, and a TA update message.

The second message carries an identifier of the terminal in an RRC inactive state and information about a cause for triggering sending of the second message.

The identifier in the RRC inactive state may be an I-RNTI. The I-RNTI is used to identify the terminal within a range of the cell indicated by the RNA information. Optionally, the identifier of the terminal in the RRC inactive state is associated with the first access network device and an architecture of the first access network device. Specifically, the identifier of the terminal in the RRC inactive state carries an identifier of the first access network device and information about whether the first access network device has a CU/DU architecture. The identifier of the first access network device is used by the second access network device to address the first access network device. The information about the architecture of the first access network device is used by the second access network device to determine whether an anchor access network device of the terminal is migrated.

The information (which is referred to as cause information in this specification) about the cause for triggering sending of the second message includes a cause value for triggering sending of the second message and other information used to determine whether the anchor access network device of the terminal is migrated. For example, the cause information may be an uplink buffer status report, a service/slice type to which the uplink data belongs, QoS class information, and network load.

For example, if the second message carries the QoS class information, the QoS class information indicates that the terminal is sensitive to a transmission delay. In this case, after the second access network device receives the second message, to reduce the transmission delay of the terminal, the anchor may be selected to be migrated to the second access network device, so that the second access network device that is relatively close to the terminal or that has better quality of service provides a coverage service for the terminal, to reduce the transmission delay of the terminal and improve quality of service of the terminal.

Optionally, the second message further includes a short media access control integrity protection value (MAC-I), and the short MAC-I is used by the access network device to verify an identity of the terminal.

Optionally, the second message further includes the uplink data. For example, the terminal processes the uplink data in the second message by using the protocol entities corresponding to the DRB. A specific manner of processing the second message is not limited in the embodiments of this application.

Optionally, the second message further includes the uplink signaling. For example, the terminal processes the uplink signaling in the second message by using protocol entities corresponding to an SRB 0. A specific manner of processing the second message is not limited in the embodiments of this application.

Optionally, the second message further includes a state switching request, and the state switching request is used by the terminal to request to switch from the inactive state to a connected state.

It should be noted that when the terminal needs to send uplink data or signaling to a network, the terminal may send the uplink data or signaling to the access network device by performing a random access process or on an agreed resource. For example, the terminal sends the uplink data or signaling to the access network device on a grant-free shared resource broadcast by using system information. Correspondingly, in the embodiments of this application, the terminal may send the uplink data in the following manners:

In a first implementation, the terminal needs to first switch the RRC state, and then send the uplink data to the second access network device. For example, the terminal may first send the second message including the state switching request to the second access network device; then, the terminal receives a state switching request response sent by the second access network device; and if the state switching request response indicates that the second access network device determines that the terminal may be switched from the inactive state to the connected state, the terminal may send the uplink data to the second access network device, so that the second access network device processes the uplink data; or if the second access network device determines that migration of the anchor does not need to be performed (where the migration of the anchor means migration of an entry of the terminal in a core network from the first access network device to the second access network device), the second access network device sends the uplink data to the first access network device, and the first access network device processes the uplink data.

In a second implementation, the RRC state switching and the uplink data processing procedure may be performed at the same time. For example, the terminal may send, to the second access network device, the second message that includes the state switching request and the uplink data; the second access network device indicates, based on the state switching request carried in the second message, the terminal to enter the connected state, and the second access network device processes the uplink data carried in the second message. In the second implementation, because the terminal can send the uplink data in an RRC state switching process, a service delay of the terminal is shortened.

In a third implementation, the terminal may directly send the uplink data to the second access network device, so that the second access network device processes the uplink data. In the third implementation, the RRC state switching procedure is not required, and a service delay of the terminal is further shortened.

The second message in the embodiments of this application is described above by using only an example in which the second message includes the status switching request, or includes the status switching request and the uplink data, or includes the uplink data. Information specifically included in the second message may be determined based on an actual application scenario. This is not limited in the embodiments of this application.

Optionally, after the second access network device receives the second message, the second access network device may send a response message of the second message to the terminal.

For example, if the second message carries to-be-transmitted uplink data, the response message of the second message may feed back transmission of the uplink data. For example, if the uplink data is successfully transmitted, the second access network device sends the response message of the second message to the terminal. The response message indicates that the uplink data of the terminal has been successfully transmitted.

If the second message is a message used to initiate the state switching request, after the terminal sends the second message including the state switching request to the second access network device, the second access network device may send, to the terminal, a response message used to indicate a status of the terminal. For example, the response message may indicate the terminal to keep in the RRC inactive state, or the response message may indicate the terminal to enter the RRC connected mode. It may be understood that, if the response message of the second message indicates the terminal to keep in the RRC inactive state, optionally, the second access network device updates context information of the terminal, for example, updates the identifier of the terminal in the inactive state and/or the RNA information of the terminal.

S504: The second access network device determines whether the entry of the terminal in the core network needs to be migrated from the first access network device to the second access network device.

If the anchor access network device of the terminal needs to be migrated, S505 and S506 are performed; or if the anchor access network device of the terminal does not need to be migrated, the uplink information (if there is the uplink information) is buffered, and S507 is performed.

Optionally, the second access network device determines, based on the cause information carried in the second message sent by the terminal, whether the anchor access network device is migrated.

S505: The second access network device sends, to the first access network device, a request message for obtaining the context information of the terminal.

Correspondingly, the first access network device receives the request message sent by the second access network device.

The request message carries the identifier of the terminal in the RRC inactive state.

Optionally, after receiving the second message, the second access network device addresses the first access network device based on the identifier, carried in the second message, of the terminal in the inactive state. For example, the second access network device addresses the first access network device based on the identifier of the first access network device carried in the identifier of the terminal in the inactive state.

S506: The first access network device sends the context information of the terminal to the second access network device.

Correspondingly, the second access network device receives the context information of the terminal sent by the first access network device.

It may be understood that, after receiving the context information of the terminal, the second access network device may generate, based on the context information of the terminal, protocol entities corresponding to the terminal, and process data or signaling of the terminal by using the corresponding protocol entities.

S507: The second access network device sends the uplink information to the first access network device.

Correspondingly, the first access network device receives the uplink information sent by the second access network device.

In a possible implementation, after receiving the second message, the second access network device addresses the first access network device based on the identifier, carried in the second message, of the terminal in the inactive state. For example, the second access network device addresses the first access network device based on the identifier of the first access network device carried in the identifier of the terminal in the inactive state.

Optionally, the second access network device sends, to the first access network device, the uplink information in the following formats:

1: a MAC PDU format; and
2: a format in which a MAC service data unit (SDU), a logical channel identifier (LCD), an I-RNTI, and a short MAC-I are combined.

The format of the uplink information sent by the second access network device to the first access network device is not limited to the two listed formats.

Optionally, the second access network device may further send the cause information corresponding to the uplink information to the first access network device by using an interface encapsulation protocol between the access network devices. For a function of the cause information, refer to the foregoing descriptions. Details are not described herein again.

Currently, in a 3GPP LTE narrowband internet of things (NB-IoT), an anchor access network device always needs to be migrated. In a process of migrating the anchor access network device, the second access network device needs to obtain the context information of the terminal and the like from the first access network device. Consequently, signaling overheads and power consumption of the terminal are increased. According to the communication method provided in this embodiment of this application, the second access network device can determine, based on the cause information in the second message, whether the anchor access network device of the terminal is migrated, and the anchor access network device of the terminal is migrated only when a condition for migrating the anchor access network device is met. For example, in this embodiment of this application, when a small amount of data is transmitted, the anchor access network device may not be migrated, to alleviate a problem that signaling overheads are relatively high because the context information is transmitted between the first access network device and the second access network device. In addition, if the anchor access network device of the terminal needs to be migrated, the second access network device provides a service for the terminal. Because the second access network device is usually relatively close to the terminal or has better quality of service, communication quality of the terminal can be improved.

Figure 6:
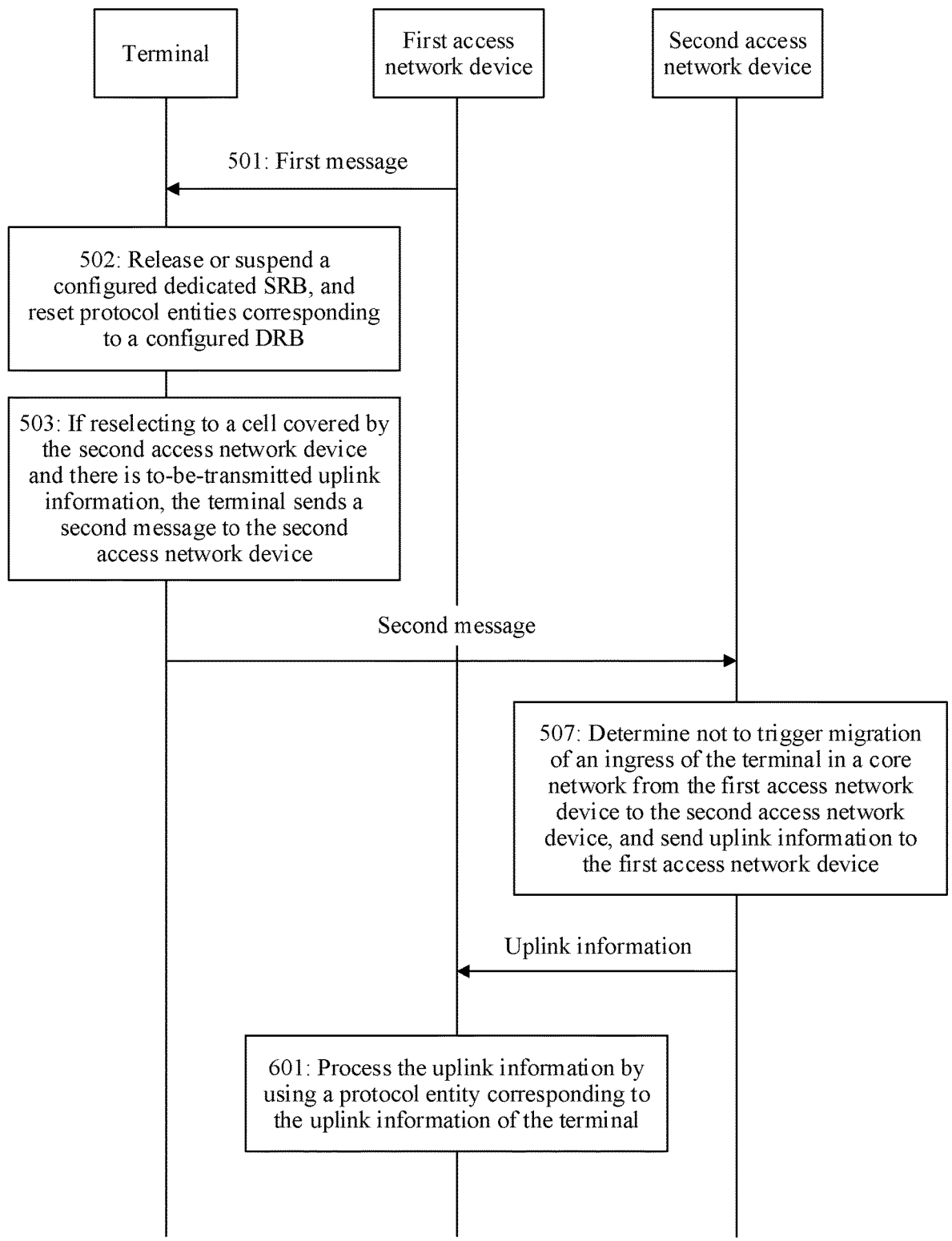
FIG. 6 is a flowchart of a communication method according to an embodiment of this application.

With reference to the methods corresponding to FIG. 2, FIG. 4, FIG. 5A, and FIG. 5B, optionally, if the second access network device determines not to trigger migration of the entry of the terminal in the core network from the first access network device to the second access network device, the first access network device processes the uplink information of the terminal. Based on this, in an implementation provided in the embodiments of this application, as shown in FIG. 6, after the second access network device sends the uplink information to the first access network device in S507, a procedure in which the first access network device processes the uplink information of the terminal includes the following step.

S601: The first access network device processes the uplink information by using a protocol entity corresponding to the uplink information of the terminal.

Optionally, a format of the uplink information received by the first access network device is as follows:

1: a MAC PDU format; or
2: a format in which a MAC SDU, an LCID, an I-RNTI, and a short MAC-I are combined.

The short MAC-I is verification information corresponding to the terminal, and is used to verify an identity of the terminal.

The second access network device may further send cause information to the first access network device. For a function of the cause information, refer to the foregoing descriptions. Details are not described herein again.

Optionally, before S601, identity information of the terminal may be verified, to ensure security of a radio access network. Specifically, the uplink information may carry the verification information corresponding to the terminal. After receiving the uplink information of the terminal, the first access network device verifies the identity of the terminal based on the verification information of the terminal. After the verification succeeds, the first access network device processes the uplink information of the terminal by using the protocol entity. For example, the verification information may be the short MAC-I. A specific form of the verification information is not limited in the embodiments of this application. Optionally, the cause information may further be used to indicate whether an access stratum security key corresponding to the terminal is updated. It may be understood that if the first access network device determines, based on the cause information, that the access stratum security key of the terminal needs to be updated, the verification information may be correspondingly updated, so that the first access network device verifies the identity of the terminal by using updated verification information.

In a possible implementation, the first access network device may determine, based on the LCID carried in the uplink information, the protocol entity corresponding to the uplink information of the terminal. The protocol entity processes received uplink information in sequence, and then sends processed uplink information to a core network device; or sends processed uplink information to an RRC entity, and the RRC entity performs a corresponding operation on the processed uplink information.

Figure 7:
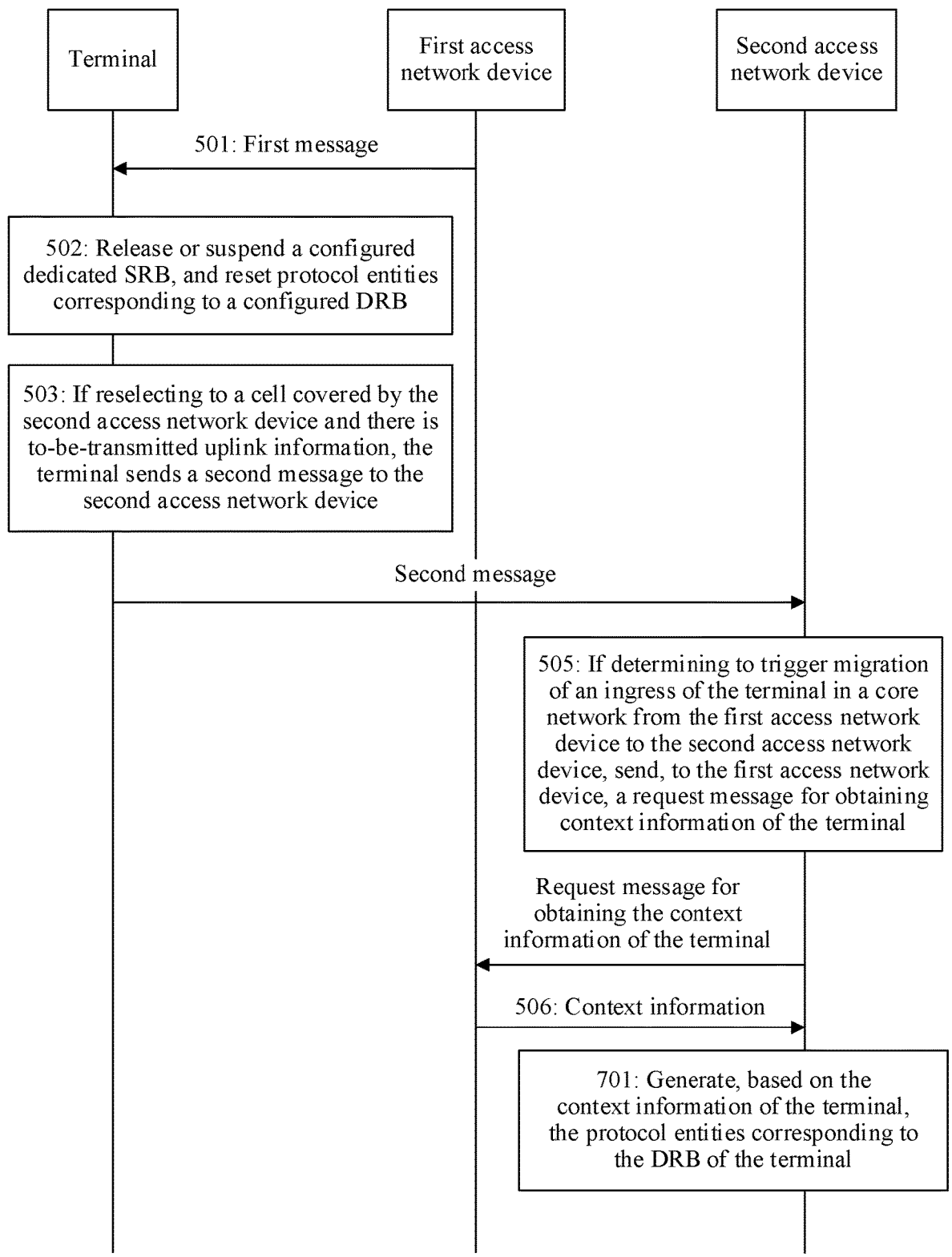
FIG. 7 is a flowchart of a communication method according to an embodiment of this application.

With reference to the methods corresponding to FIG. 2 and FIG. 4 to FIG. 6, optionally, if the second access network device determines to trigger migration of the entry of the terminal in the core network from the first access network device to the second access network device, the second access network device processes the uplink information of the terminal. Based on this, in an implementation provided in the embodiments of this application, as shown in FIG. 7, after the first access network device sends the context information of the terminal to the second access network device in S506, a procedure in which the second access network device processes the uplink information of the terminal includes the following step.

S701: The second access network device generates, based on the context information of the terminal, the protocol entities corresponding to the DRB of the terminal.

After receiving the context information of the terminal, the second access network device triggers a path switching process, and migrates an entry of the terminal in a core network from an initial anchor access network device (namely, the first access network device) to the second access network device. For a detailed path switching process, refer to documents related to a 3GPP NR technology.

After triggering path switching, the second access network device may generate the protocol entities corresponding to the DRB of the terminal, and may process the uplink information of the terminal by using the generated protocol entities.

Figure 8:
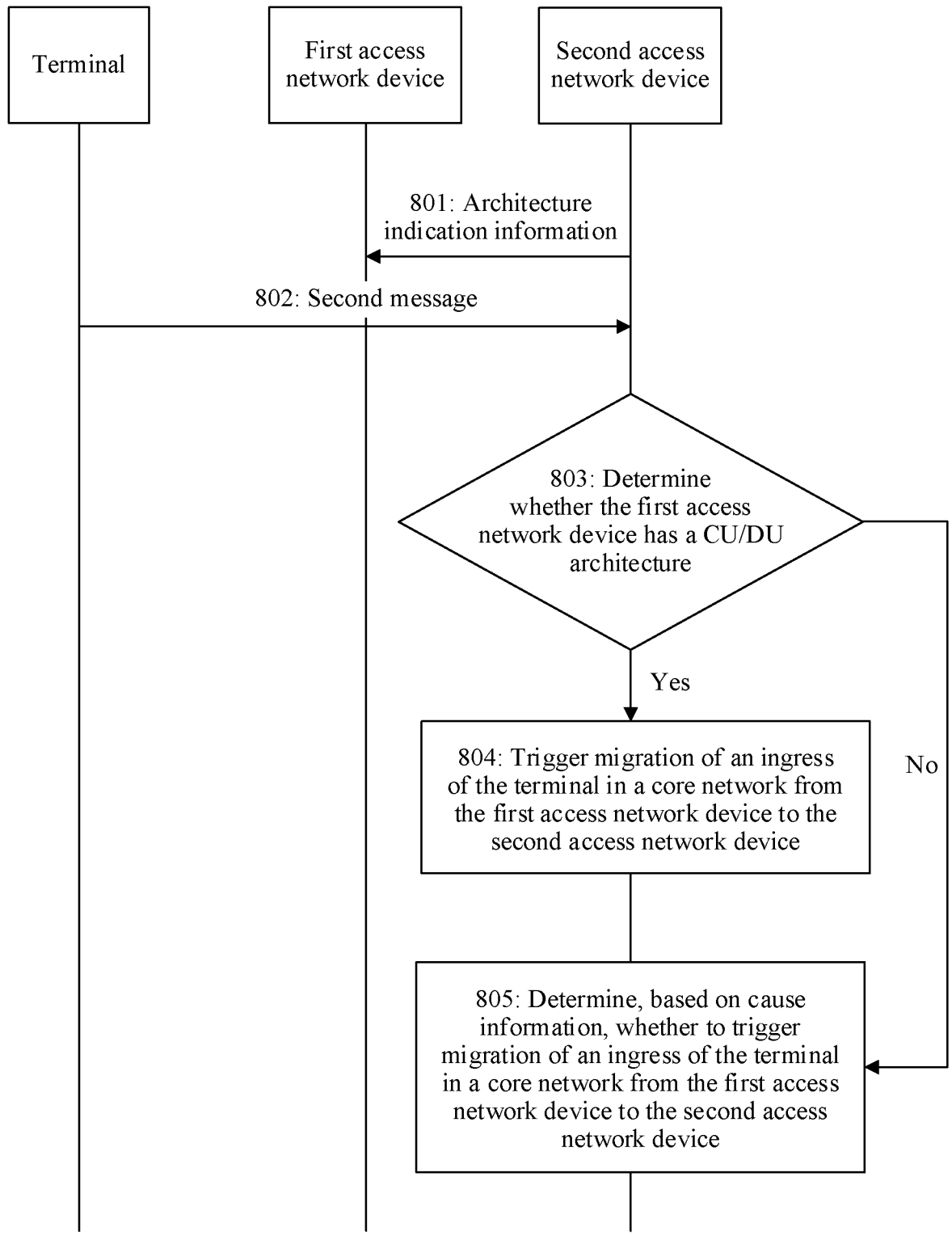
FIG. 8 is a flowchart of a communication method according to an embodiment of this application.

With reference to the methods corresponding to FIG. 2 and FIG. 4 to FIG. 7, an embodiment of this application further provides a method for determining whether to trigger migration of an entry of a terminal in a core network from a first access network device to a second access network device. As shown in FIG. 8, the method includes S801 to S805.

S801: The second access network device obtains architecture indication information of the first access network device. The architecture indication information is used to indicate whether the first access network device is an access network device having a CU/DU architecture.

In a possible implementation, S801 may be specifically implemented as follows: The first access network device sends the architecture indication information to the second access network device. Correspondingly, the second access network device receives the architecture indication information sent by the first access network device.

Specifically, in an initialized Xn setup process of an Xn interface between base stations, the first access network device sends the architecture indication information to the second access network device, or the first access network device updates the architecture indication information by performing a configuration update procedure, and sends updated architecture indication information to the second access network device.

S802: The terminal sends a second message to the second access network device.

A function of the second message is the same as that of the foregoing second message. Details are not described herein again.

It should be noted that a time sequence of performing S801 and S802 is not limited. S801 may be performed before S802, or S802 may be performed before 801. This is not limited in this embodiment of this application.

S803: The second access network device determines whether the first access network device has a CU/DU architecture.

If the first access network device has the CU/DU architecture, S804 is performed; or if the first access network device does not have the CU/DU architecture, S805 is performed.

In a possible implementation, the second access network device determines, based on the architecture indication information sent by the first access network device, whether the first access network device has the CU/DU architecture.

Alternatively, the second access network device determines, based on an identifier that is of the terminal in an RRC inactive state and that is in the second message, whether the first access network device has the CU/DU architecture. For example, the identifier of the terminal in the inactive state may be an I-RNTI, and the I-RNTI may carry information used to determine the architecture of the first access network device. For example, most significant 20 bits in the I-RNTI may be used to identify whether the first access network device has the CU/DU architecture. It may be understood that only an example in which the most significant 20 bits in the I-RNTI are flag bits is used herein. A specific quantity of bits used in the I-RNTI and specific positions of the bits may be determined based on an actual application scenario. This is not limited in this embodiment of this application.

S804: Trigger migration of an entry of the terminal in a core network from the first access network device to the second access network device.

S805: Determine, based on cause information, whether to trigger migration of an entry of the terminal in a core network from the first access network device to the second access network device.

According to the communication method provided in this embodiment of this application, whether an anchor access network device of the terminal is migrated is determined based on the architecture of the first access network device. If the first access network device has the CU/DU architecture, the anchor access network device of the terminal is migrated to the second access network device, and the second access network device processes uplink information of the terminal. In the prior art, when the first access network device having the CU/DU architecture processes the uplink information, the CU and the DU need to exchange signaling, and signaling overheads are higher.

Figure 9:
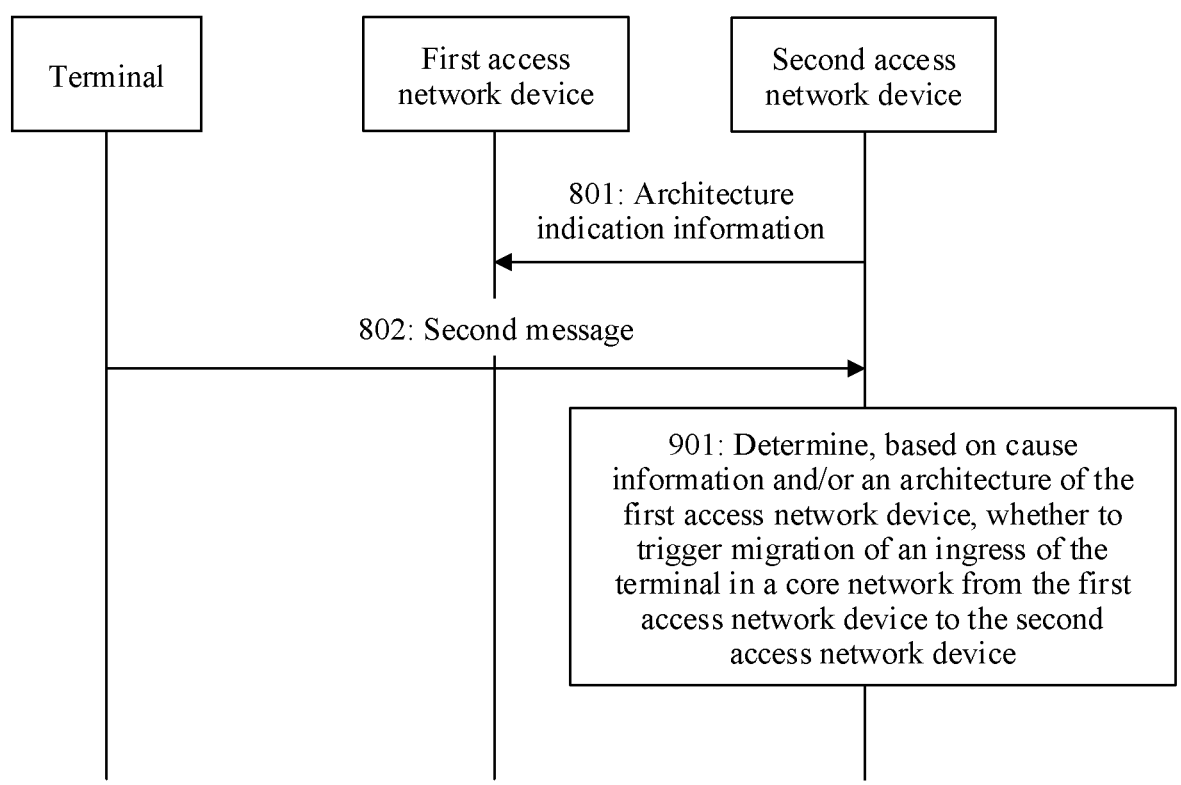
FIG. 9 is a flowchart of a communication method according to an embodiment of this application.

With reference to the methods corresponding to FIG. 2 and FIG. 4 to FIG. 8, optionally, in the embodiments of this application, whether the anchor access network device of the terminal is migrated may alternatively be determined by using a plurality of indicators. Based on this, in another implementation provided in the embodiments of this application, as shown in FIG. 9, a procedure for determining whether the anchor access network device of the terminal is migrated may further include the following step.

S901: The second access network device determines, based on the cause information and/or the architecture of the first access network device, whether to trigger migration of an entry of the terminal in a core network from the first access network device to the second access network device.

Optionally, when the first access network device has the CU/DU architecture, according to the method corresponding to FIG. 8, regardless of whether the cause information indicates migration of the anchor access network device, the anchor access network device of the terminal is migrated to the second access network device. When the first access network device does not have the CU/DU architecture, with reference to the procedures shown in FIG. 5A to FIG. 8, whether the anchor access network device is migrated is determined based on the cause information.

Alternatively, when the first access network device has the CU/DU architecture, and the cause information indicates migration of the anchor access network device, the anchor access network device of the terminal is migrated to the second access network device.

It should be noted that, because the uplink data is usually in a MAC SDU format, and the uplink data in this format usually first arrives at the CU of the access network device. If the protocol stack splitting method (to be specific, an RLC protocol layer and a protocol layer below the RLC protocol layer are deployed in the DU, and a PDCP protocol layer and a protocol layer above the PDCP protocol layer are deployed in the CU) shown in FIG. 1b is used, the CU of the first access network device needs to send the uplink data to the DU, and the RLC entity deployed in the DU processes the uplink data. For example, the RLC entity combines segmented uplink data, and sends combined data to the CU. The PDCP entity deployed in the CU processes the uplink data. For example, the PDCP entity decompresses and decrypts the uplink data. It may be learned that, to process the uplink data, the CU and the DU need to frequently interact with each other. This causes a relatively large processing delay.

Figure 10:
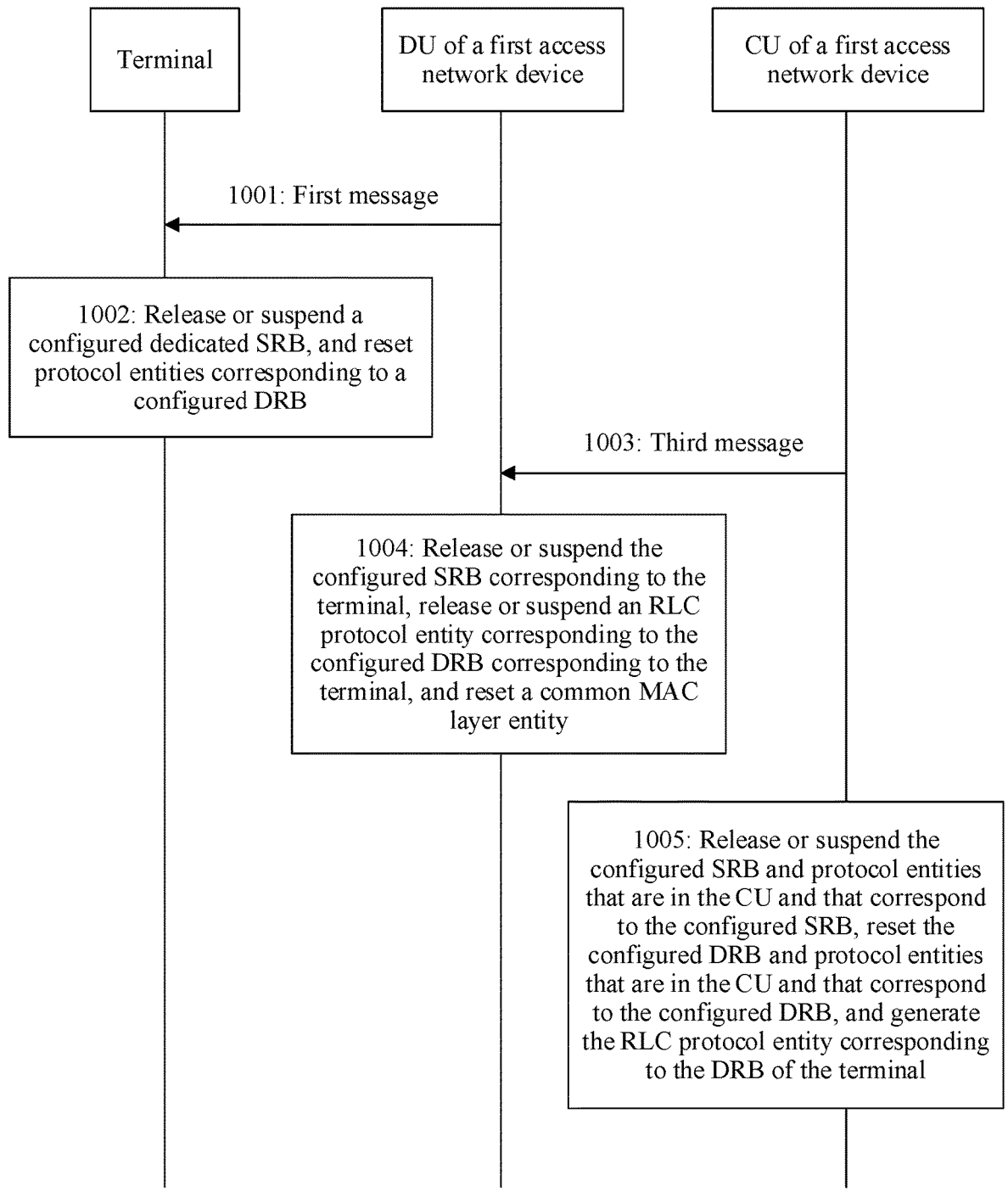
FIG. 10 is a flowchart of a communication method according to an embodiment of this application.

To reduce the processing delay caused by frequent interaction between the CU and the DU, with reference to the methods corresponding to FIG. 2 and FIG. 4 to FIG. 9, when a first access network device has a CU/DU architecture (in other words, the first access network device includes a CU and a DU), an embodiment of this application further provides a communication method. As shown in FIG. 10, the method includes S1001 to S1005.

S1001: The first access network device sends a first message to a terminal.

Optionally, the DU of the first access network device sends the first message to the terminal.

S1002: The terminal releases or suspends a configured dedicated signaling radio bearer (SRB), and resets protocol entities corresponding to a configured data radio bearer (DRB).

For S1002, refer to the descriptions of S202. Details are not described herein again.

S1003: In the first access network device, the CU sends a third message to the DU.

Correspondingly, the DU of the first access network device receives the third message sent by the CU.

The third message includes an identifier of the terminal in an RRC connected state. The third message is used to indicate the DU to switch the terminal to an inactive state. For example, the identifier of the terminal in the RRC connected state is a C-RNTI.

It should be noted that a time sequence of performing step S1001 and step S1003 is not limited. For example, the terminal may first perform S1001 and then perform 1003, or may simultaneously perform S1001 and S1003. This is not limited in this embodiment of this application.

S1004: The DU of the first access network device releases or suspends the configured SRB corresponding to the terminal, releases or suspends an RLC protocol entity corresponding to the configured DRB corresponding to the terminal, and resets a MAC entity.

Optionally, the first access network device may further reset a PHY entity.

Figure 11:
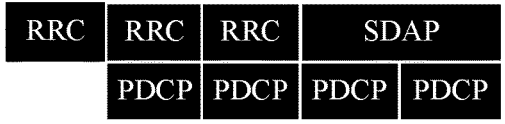
FIG. 11 is a schematic diagram of a protocol stack according to an embodiment of this application.
Figure 11:
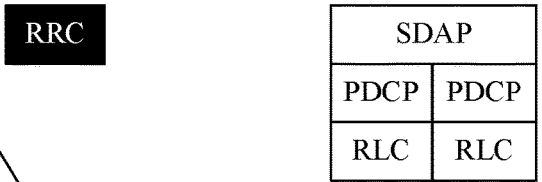
Figure 11:
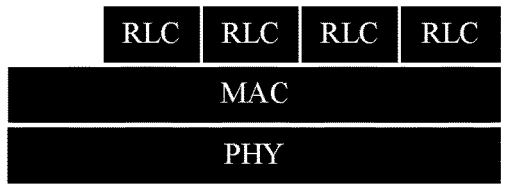
Figure 11:
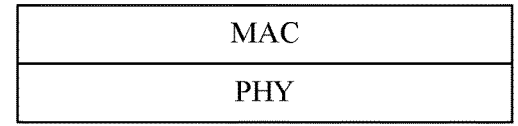
Figure 11:
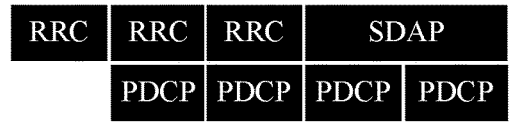
Figure 11:
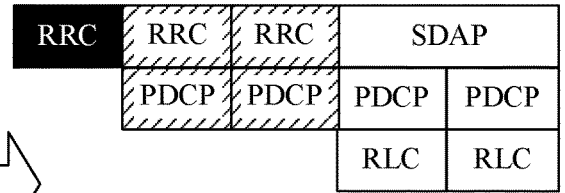
Figure 11:
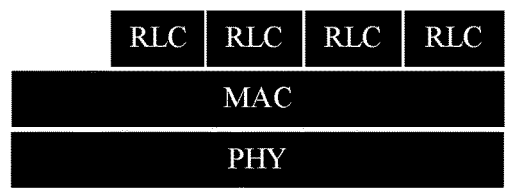
Figure 11:
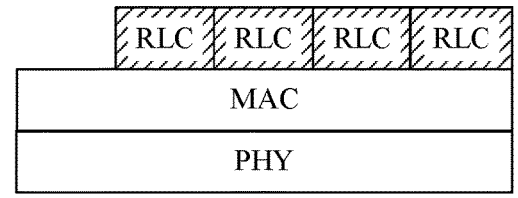

For example, as shown in FIG. 11, it is assumed that the terminal is configured with four dedicated radio bearers and one common SRB, the four dedicated radio bearers are an SRB 1, an SRB 2, a DRB 1, and a DRB 2, and the common SRB is an SRB 0. In this case, before and after the CU sends the third message to the DU, protocol stacks in the DU are shown in FIG. 11. Correspondingly, the DU performs the following operations:

1: The DU releases or suspends the SRB 1 and the SRB 2. Specifically, the DU releases or suspends an RLC entity corresponding to each of the SRB 1 and the SRB 2. (a) in FIG. 11 is a schematic diagram of releasing corresponding bearers and protocol entities by the DU. (b) in FIG. 11 is a schematic diagram of suspending corresponding bearers and protocol entities by the DU.

2: The DU resets the common MAC entity.

3: Release or suspend RLC protocol entities corresponding to the DRBs of the terminal. As shown in (a) in FIG. 11, the DU releases the RLC protocol entities corresponding to the DRBs of the terminal. As shown in (b) in FIG. 11, the DU suspends the RLC protocol entities corresponding to the DRBs of the terminal.

Optionally, after this step, the DU of the first access network device sends a response message of the third message to the CU, to indicate that the DU has processed the bearers and the protocol entities of the terminal.

S1005: The CU of the first access network device releases or suspends the configured SRB and protocol entities that are in the CU and that correspond to the configured SRB, resets the configured DRB and protocol entities that are in the CU and that correspond to the configured DRB, and generates the RLC protocol entity corresponding to the DRB of the terminal.

Optionally, after receiving the response message that is of the third message and sent by the DU, the CU performs this step. Alternatively, the CU may directly perform this step after sending the third message. This is not limited in this embodiment of this application.

For example, the CU performs the following operations:

1: The CU releases or suspends the SRB 1 and the SRB 2. Specifically, the CU releases an RRC entity and a PDCP entity that correspond to each of the SRB 1 and the SRB 2. (a) in FIG. 11 is a schematic diagram of a protocol stack of the terminal before and after the CU releases the protocol entities corresponding to the SRB 1 and the SRB 2 of the terminal. (b) in FIG. 11 is a schematic diagram of a protocol stack of the terminal before and after the CU suspends the protocol entities corresponding to the SRB 1 and the SRB 2 of the terminal.

Correspondingly, the terminal may process to-be-transmitted uplink signaling by using the RRC entity corresponding to the SRB 0, and transmit processed uplink signaling on the SRB 0.

2: The CU resets a PDCP entity corresponding to each of the DRB 1 and the DRB 2, and resets a configured SDAP entity. In addition, the CU generates RLC entities corresponding to the DRBs of the terminal. Therefore, when the terminal needs to transmit uplink data, the SDAP entity, the PDCP entities, and the RLC entities can sequentially process the uplink data.

According to the communication method provided in this embodiment of this application, after the terminal enters the inactive state, the RLC protocol entity corresponding to the DRB of the terminal is deployed in the CU, and the RLC protocol entity that corresponds to the terminal and that is in the DU is released or suspended. In this case, when uplink data arrives, the CU of the first access network device may process uplink data in a MAC SDU format by using the deployed RLC protocol entity, and then sequentially send processed uplink data to the PDCP entity and the SDAP entity for processing. The CU does not need to frequently interact with the DU. This reduces a processing delay.

It may be understood that the message names in the embodiments of this application are merely for ease of description, and may be other message names during specific implementation. Various types of information listed in the embodiments of this application may be sent at the same time, for example, sent in one message, or may not be simultaneously sent, for example, sent in different messages.

In the foregoing method embodiments in FIG. 2 and FIG. 4 to FIG. 11, an access network device and a terminal are used as examples for description. It may be understood that methods and functions implemented by the access network device in the foregoing method embodiments may alternatively be implemented by using a chip that may be used in the access network device, and methods and functions implemented by the terminal may alternatively be implemented by using a chip that may be used in the terminal.

The solutions provided in the embodiments of this application are described above mainly from a perspective of interaction between the different network elements. It may be understood that, to implement the foregoing functions, a network side device (including but not limited to the first access network device and the second access network device) and the terminal each include corresponding hardware structures and/or software modules for performing the functions. With reference to the units and algorithm steps in the examples described the embodiments disclosed in this application, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In an embodiment of this application, function unit division may be performed on the network side device, the terminal, or the like based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in the embodiments of this application, division into the units is merely an example, is merely logical function division, and may be other division during actual implementation.

Figure 12:
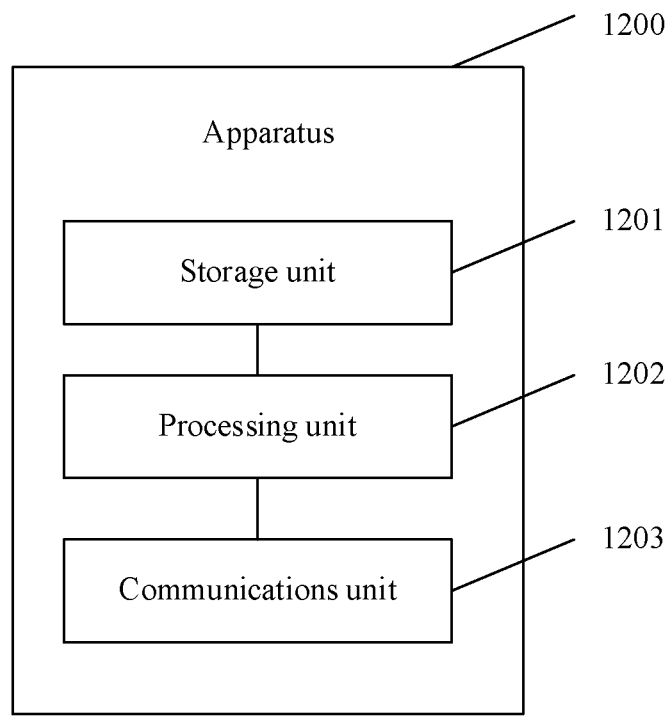
FIG. 12 is a schematic structural diagram of a communications apparatus according to an embodiment of this application.

FIG. 12 is a schematic block diagram of a communications apparatus according to an embodiment of this application. The communications apparatus 1200 may exist in a form of software, or may be a terminal, or may be a chip in a terminal. The apparatus 1200 includes a processing unit 1202 and a communications unit 1203. For example, the processing unit 1202 may be configured to support the apparatus 1200 in performing S201 in FIG. 2, S503 in FIG. 5A, and/or another process of the solutions described in this specification. The communications unit 1203 is configured to support communication between the apparatus 1200 and another network element (for example, a network side device).

Optionally, the communications apparatus 1200 may further include a storage unit 1201, configured to store program code and data of the apparatus 1200. The data may include but is not limited to original data, intermediate data, or the like.

In a possible implementation, the processing unit 1202 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 1202 may implement or execute examples of various logical blocks, modules, and circuits described with reference to content disclosed in this application. The processor may be a combination of processors implementing a computing function, for example, a combination of one or more microprocessors, or a combination of a DSP and a microprocessor. The communications unit 1203 may be a transceiver, a transceiver circuit, a communications interface, or the like. The storage unit 1201 may be a memory.

Figure 13:
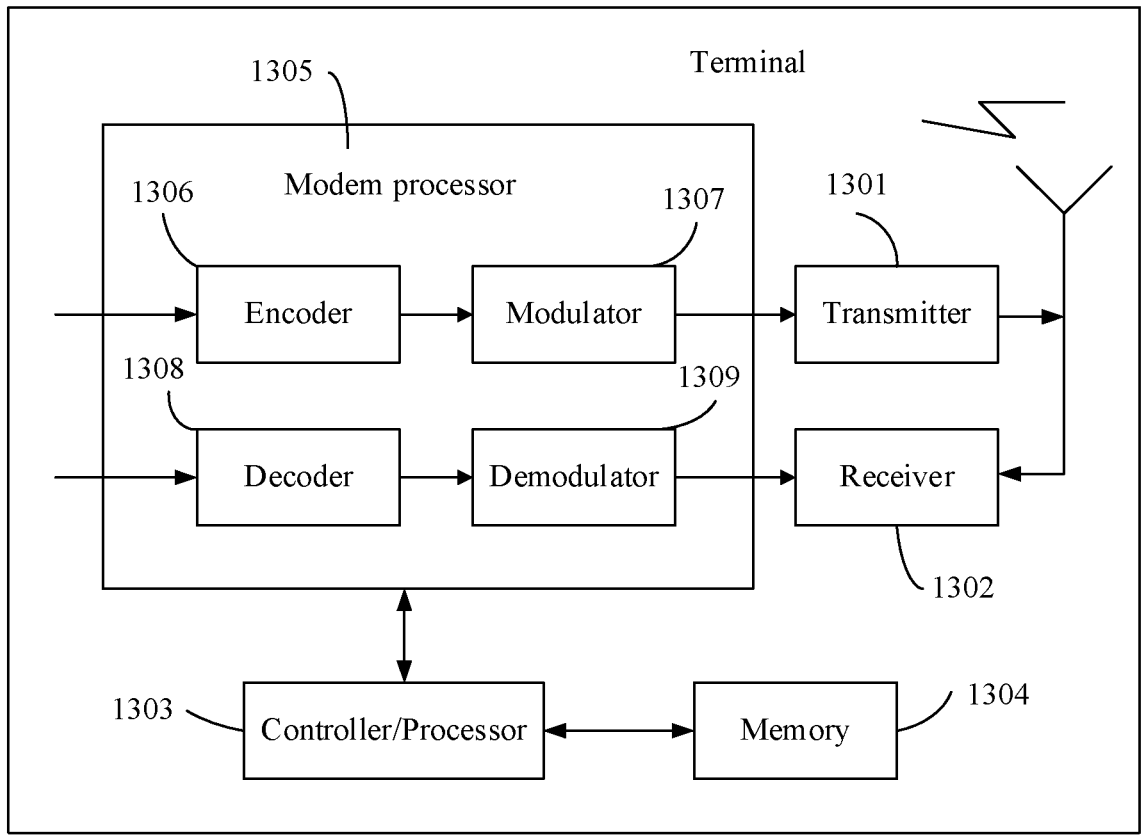
FIG. 13 is a schematic structural diagram of a terminal according to an embodiment of this application.

In a possible manner, when the processing unit 1202 is a processor, the communications unit 1203 is a transceiver, and the storage unit 1201 is a memory, the terminal in this embodiment of this application may be the terminal shown in FIG. 13.

FIG. 13 is a simplified schematic diagram of a possible design of a terminal according to an embodiment of this application. The terminal 1300 includes a transmitter 1301, a receiver 1302, and a processor 1303. The processor 1303 may alternatively be a controller, and is represented as a "controller/processor 1303" in FIG. 13. Optionally, the terminal 1300 may further include a modem processor 1305. The modem processor 1305 may include an encoder 1306, a modulator 1307, a decoder 1308, and a demodulator 1309.

In an example, the transmitter 1301 adjusts (for example, analog converts, filters, amplifies, and frequency up-converts) an output sample and generates an uplink signal. The uplink signal is transmitted to the base station in the foregoing embodiments by using an antenna. On a downlink, the antenna receives a downlink signal transmitted by the base station in the foregoing embodiments. The receiver 1302 adjusts (for example, filters, amplifies, frequency down-converts, and digitizes) a signal received from the antenna, and provides an input sample. In the modem processor 1305, the encoder 1306 receives service data and a signaling message that are to be sent on an uplink, and processes (for example, formats, encodes, and interleaves) the service data and the signaling message. The modulator 1307 further processes (for example, symbol maps and modulates) encoded service data and an encoded signaling message, and provides an output sample. The demodulator 1309 processes (for example, demodulates) the input sample and provides symbol estimation. The decoder 1308 processes (for example, de-interleaves and decodes) the symbol estimation and provides decoded data and a decoded signaling message that are to be sent to the terminal 1300. The encoder 1306, the modulator 1307, the demodulator 1309, and the decoder 1308 may be implemented as a combined modem processor 1305. These units perform processing based on a radio access technology (for example, access technologies of an LTE system and another evolved system) used by a radio access network. It should be noted that when the terminal 1300 does not include the modem processor 1305, the foregoing functions of the modem processor 1305 may also be implemented by the processor 1303.

The processor 1303 controls and manages an action of the terminal 1300, and is configured to perform a processing process performed by the terminal 1300 in the foregoing embodiments of this application. For example, the processor 1303 is further configured to perform the processing processes of the terminal in the methods shown FIG. 2 and FIG. 4 to FIG. 6 and/or another process of the technical solutions described in this application.

The terminal 1300 may further include a memory 1304. The memory 1304 is configured to store program code and data that are used for the terminal 1300.

Figure 14:
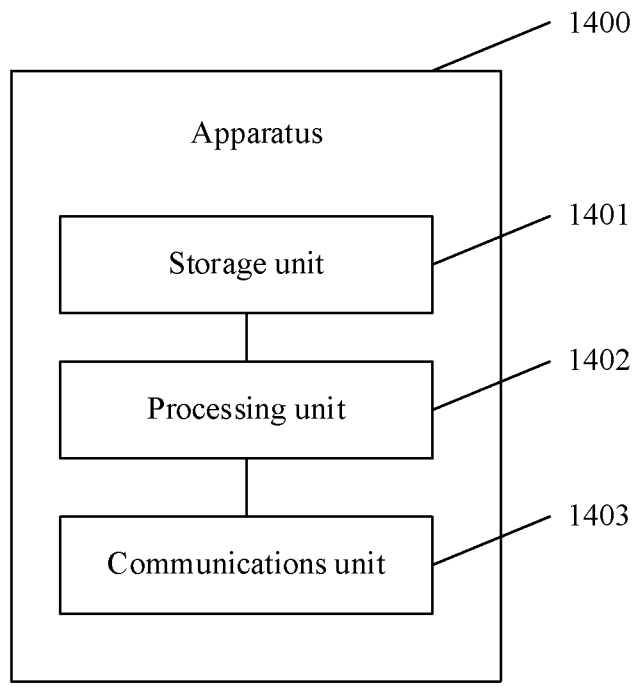
FIG. 14 is a schematic structural diagram of a communications apparatus according to an embodiment of this application.

FIG. 14 is a block diagram of a possible example of another communications apparatus according to an embodiment of this application. The apparatus 1400 may exist in a form of software, or may be a network side device such as a base station, or may be a chip that may be used in a network side device. The apparatus 1400 includes a processing unit 1402 and a communications unit 1403. The processing unit 1402 is configured to control and manage an action of the apparatus 1400. For example, if the apparatus is a first access network device, the processing unit 1402 is configured to support the apparatus 1400 in performing S203 in FIGS. 2, S405 and S406 in FIG. 4, and/or another process of the technical solutions described in this specification. If the apparatus is a second access network device, the processing unit 1402 is configured to support the apparatus 1400 in performing S504, S505, and S507 in FIG. 5, S701 in FIG. 7, and/or another process of the technologies described in this specification. The communications unit 1403 is configured to support the apparatus 1400 in communicating with another network entity (for example, a terminal). The apparatus 1400 may further include a storage unit 1401, configured to store program code and data of the apparatus 1400.

The processing unit 1402 may be a processor or a controller, for example, may be a CPU, a general-purpose processor, a DSP, an ASIC, an FPGA or another programmable logic device, a transistor logic device, a hardware component, or any combination thereof. The processing unit 1402 may implement or execute examples of various logical blocks, modules, and circuits described with reference to content disclosed in this application. The processor may be a combination of processors implementing a computing function, for example, a combination of one or more microprocessors, or a combination of a DSP and a microprocessor. The communications unit 1403 may be a communications interface, a transceiver, a transceiver circuit, or the like. The communications interface is an umbrella term. During specific implementation, the communications interface may include a plurality of interfaces, for example, may include an interface between a base station and a terminal, and/or another interface. The storage unit 1401 may be a memory.

Figure 15:
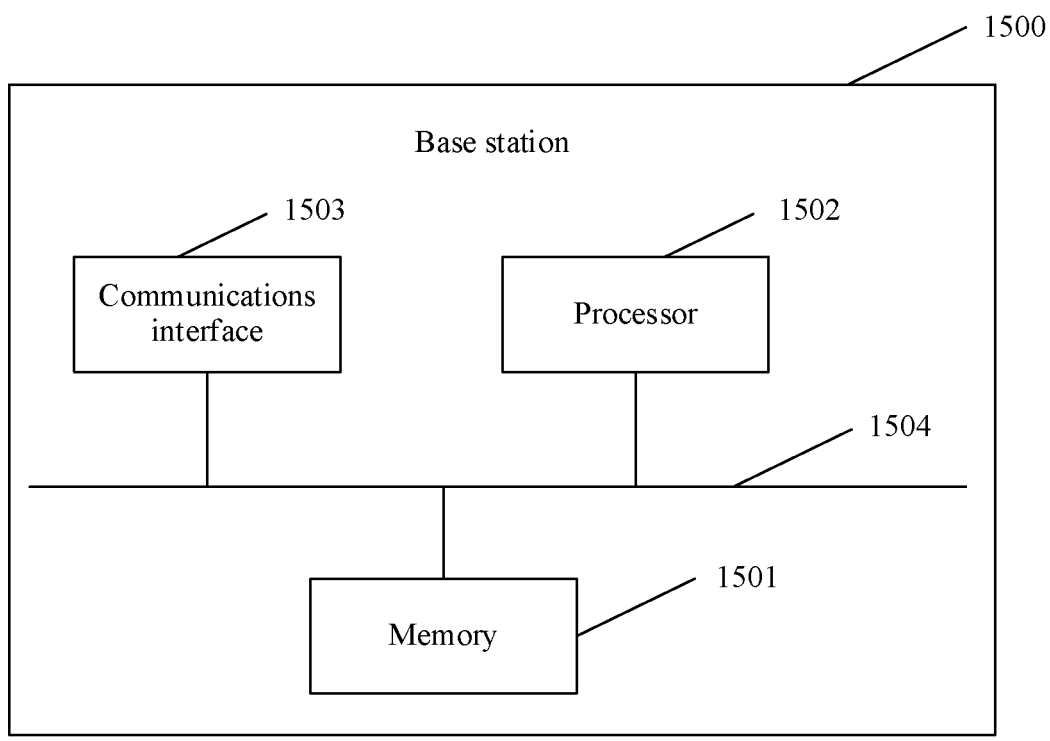
FIG. 15 is a schematic structural diagram of a base station according to an embodiment of this application.

When the processing unit 1402 is a processor, the communications unit 1403 is a communications interface, and the storage unit 1401 is a memory, the apparatus 1400 in this embodiment of this application may be the base station shown in FIG. 15.

Referring to FIG. 15, the base station 1500 includes a processor 1502, a communications interface 1503, and a memory 1501. Optionally, the base station 1500 may further include a bus 1504. The communications interface 1503, the processor 1502, and the memory 1501 may be interconnected by using the bus 1504. The bus 1504 may be a peripheral component interconnect (PCI for short) bus, an extended industry standard architecture (EISA for short) bus, or the like. The bus 1504 may be classified into an address bus, a data bus, a control bus, and the like. For ease of representation, only one bold line is used to represent the bus in FIG. 15, but this does not mean that there is only one bus or only one type of bus.

A person of ordinary skill in the art may understand that all or some of the foregoing embodiments may be implemented by using software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed systems, apparatuses, and methods may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions of the embodiments.

In addition, function units in the embodiments of this application may be integrated into one processing unit, or each of the function units may exist alone, or two or more units are integrated into one unit. The integrated unit may be implemented in a form of hardware, or may be implemented in a form of a software function unit.

Based on the foregoing descriptions of the implementations, a person skilled in the art may clearly understand that this application may be implemented by software in addition to necessary universal hardware or by hardware only. In most cases, the former is a better implementation. Based on such an understanding, the technical solutions of this application essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
   receiving, by a terminal, a first message from a first access network device, wherein the first message is used to indicate to the terminal to enter a radio resource control (RRC) inactive state, and the first message carries an identifier of the terminal instructed to enter the RRC inactive state and radio access network notification area (RNA) information; and
   releasing or suspending a configured dedicated signaling radio bearer (SRB), and resetting protocol entities corresponding to a configured data radio bearer (DRB);
   wherein the protocol entities corresponding to the DRB comprise a packet data convergence protocol (PDCP) entity, a radio link control (RLC) entity, and a common media access control (MAC) entity; or
   the protocol entities corresponding to the DRB comprise a PDCP entity, an RLC entity, a common MAC entity, and a service data adaptation protocol (SDAP) entity.

2. The method according to claim 1, wherein the releasing or suspending a configured dedicated SRB, and the resetting the protocol entities corresponding to a configured DRB comprises: when no scheduling information is received within preset duration after the first message is received, after the preset duration, releasing or suspending the configured dedicated SRB and the protocol entities corresponding to the SRB, and resetting the configured dedicated DRB and the protocol entities corresponding to the DRB.

3. The method according to claim 1, wherein the releasing or suspending the configured dedicated SRB and the protocol entities corresponding to the SRB, and resetting the configured dedicated DRB and the protocol entities corresponding to the DRB comprises: performing a cell reselection operation after the first message is received; and when a first cell is reselected to within the preset duration, releasing or suspending the configured dedicated SRB and resetting the protocol entities corresponding to the configured DRB, wherein the first cell belongs to a cell indicated by the RNA information, and is different from a cell in which the first message is received.

4. The method according to claim 2, wherein the first message carries timing information, and the timing information is used to indicate the preset duration.

5. The method according to claim 1, wherein the method further comprises:
when there is to-be-transmitted uplink data, transmitting the uplink data on a DRB corresponding to the uplink data; or
when there is to-be-transmitted uplink signaling, transmitting the uplink signaling on a common signaling radio bearer.

6. The method according to claim 1, wherein after the releasing or suspending the configured dedicated SRB and the protocol entities corresponding to the SRB, and resetting the configured dedicated DRB and the protocol entities corresponding to the DRB, the method further comprises:
when a cell covered by a second access network device is reselected and there is to-be-transmitted uplink information, sending a second message to the second access network device, wherein the second message carries the identifier of the terminal in the RRC inactive state and information about a cause for triggering sending of the second message, and the cell that is reselected belongs to the cell indicated by the RNA information, and
the identifier of the terminal in the RRC inactive state is associated with the first access network device and an architecture of the first access network device.

7. A communication method, comprising:
sending, by a first access network device, a first message to a terminal, wherein the first message is used to indicate to the terminal to enter a radio resource control (RRC) inactive state, and the first message carries an identifier of the terminal instructed to enter the RRC inactive state and radio access network notification area (RNA) information; and
releasing or suspending, by the first access network device, a configured dedicated signaling radio bearer (SRB) corresponding to the terminal, and resetting protocol entities corresponding to a configured data radio bearer (DRB) corresponding to the terminal;
wherein the protocol entities corresponding to the DRB comprise a packet data convergence protocol (PDCP) entity, a radio link control (RLC) entity, and a common media access control (MAC) entity; or
the protocol entities corresponding to the DRB comprise a (PDCP) entity, an RLC entity, a common MAC entity, and a service data adaptation protocol (SDAP) entity.

8. The method according to claim 7, wherein the releasing or suspending, by the first access network device, a configured dedicated SRB corresponding to the terminal, and the resetting the protocol entities corresponding to a configured DRB corresponding to the terminal comprises: when no scheduling information is sent to the terminal within preset duration after the first message is sent, after the preset duration, releasing or suspending the configured dedicated SRB corresponding to the terminal, and resetting the protocol entities corresponding to the configured DRB corresponding to the terminal.

9. The method according to claim 7, wherein when the first access network device comprises a centralized unit CU and a distributed unit DU, the sending, by a first access network device, a first message to a terminal comprises: sending, by the first access network device, the first message to the terminal by using the DU.

10. The method according to claim 9, wherein the method further comprises:
sending, by the CU of the first access network device, a third message to the DU, wherein the third message comprises an identifier of a second terminal in an RRC connected state, and the third message is used to indicate to the DU to switch the second terminal to the inactive state;
releasing or suspending, by the DU of the first access network device, the configured SRB corresponding to the second terminal and protocol entities that are in the DU and that correspond to the configured SRB, releasing or suspending the radio link control (RLC) protocol entity corresponding to the configured DRB corresponding to the second terminal, and resetting the common MAC entity; and
releasing or suspending, by the CU of the first access network device, the configured SRB and protocol entities that are in the CU and that correspond to the configured SRB, resetting the configured DRB and protocol entities that are in the CU and that correspond to the configured DRB, and generating the RLC protocol entity corresponding to the DRB.

11. The method according to claim 10, wherein the method further comprises:
sending, by the DU of the first access network device, a response message of the third message to the CU.

12. The method according to claim 7, wherein the method further comprises:
receiving, by the first access network device, uplink information of the terminal forwarded by a second access network device, wherein the uplink information carries the identifier of the terminal in the RRC inactive state; and
processing, by the first access network device, the uplink information by using a protocol entity corresponding to the uplink information of the terminal.

13. The method according to claim 12, wherein the uplink information carries verification information corresponding to the terminal; and
before the first access network device processes the uplink information by using the protocol entity, the method further comprises:
verifying, by the first access network device, an identity of the terminal based on the verification information; and
after the verification succeeds, processing, by the first access network device, the uplink information by using the protocol entity.

14. The method according to claim 12, wherein the uplink information carries cause information; and the method further comprises:

determining, by the first access network device based on the cause information, whether an access stratum security key corresponding to the terminal is updated.

15. The method according to claim 7, wherein the method further comprises:
    receiving, by the first access network device, a request message that is sent by the second access network device for obtaining a context of the terminal, wherein the request message carries the identifier of the terminal in the RRC inactive state; and
    sending, by the first access network device, context information of the terminal to the second access network device.

16. The method according to claim 15, wherein the method further comprises:
    sending, by the first access network device, architecture indication information to the second access network device, wherein the architecture indication information is used to indicate whether the first access network device is an access network device having a CU/DU architecture.

17. A communications apparatus, comprising:
    a receiver configured to receive a first message from a first access network device, wherein the first message is used to indicate to a terminal to enter a radio resource control (RRC) inactive state, and the first message carries an identifier of the terminal instructed to enter the RRC inactive state and radio access network notification area (RNA) information; and
    a processor configured to release or suspend a configured dedicated signaling radio bearer (SRB), and reset protocol entities corresponding to a configured data radio bearer (DRB);
    wherein the protocol entities corresponding to the DRB comprise a packet data convergence protocol (PDCP) entity, a radio link control (RLC) entity, and a common media access control (MAC) entity; or
    the protocol entities corresponding to the DRB comprise a PDCP entity, an RLC entity, a common MAC entity, and a service data adaptation protocol (SDAP) entity.

18. The apparatus according to claim 17, further comprising:
    a transmitter, configured to, when a cell covered by a second access network device is reselected and there is to-be-transmitted uplink information, send a second message to the second access network device, wherein the second message carries the identifier of the terminal in the RRC inactive state and information about a cause for triggering sending of the second message, and the cell that is reselected belongs to the cell indicated by the RNA information, and
    the identifier of the terminal in the RRC inactive state is associated with the first access network device and an architecture of the first access network device.

* * * * *

UNITED STATES PATENT AND TRADEMARK OFFICE
CERTIFICATE OF CORRECTION

| | |
|---|---|
| PATENT NO. | : 11,510,175 B2 |
| APPLICATION NO. | : 17/003086 |
| DATED | : November 22, 2022 |
| INVENTOR(S) | : Qinghai Zeng et al. |

It is certified that error appears in the above-identified patent and that said Letters Patent is hereby corrected as shown below:

In the Claims

In Column 33, Line 10, in Claim 3, after "reselected" delete "to".

In Column 34, Lines 9-10, in Claim 9, delete "CU and a distributed unit DU," and insert -- (CU) and a distributed unit (DU), wherein --.

In Column 34, Line 14, in Claim 9, after "terminal" delete "by".

Signed and Sealed this
Seventh Day of February, 2023

Katherine Kelly Vidal
*Director of the United States Patent and Trademark Office*